United States Patent
Yamabayashi et al.

(10) Patent No.: US 9,091,752 B2
(45) Date of Patent: Jul. 28, 2015

(54) RADAR DEVICE, RADAR POSITIONING SYSTEM, RADAR POSITIONING METHOD, AND COMPUTER READABLE MEDIA STORING RADAR POSITIONING PROGRAM

(71) Applicant: FURUNO Electric Co., Ltd., Nishinomiya, Hyogo-Pref. (JP)

(72) Inventors: Jun Yamabayashi, Nishinomiya (JP); Tatsuya Kojima, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 281 days.

(21) Appl. No.: 13/739,775

(22) Filed: Jan. 11, 2013

(65) Prior Publication Data

US 2013/0265188 A1 Oct. 10, 2013

(30) Foreign Application Priority Data

Jan. 12, 2012 (JP) ................. 2012-003964

(51) Int. Cl.
*G01S 13/74* (2006.01)
*G01S 13/06* (2006.01)
(Continued)

(52) U.S. Cl.
CPC . *G01S 13/06* (2013.01); *G01S 1/24* (2013.01); *G01S 1/685* (2013.01); *G01S 5/145* (2013.01); *G01S 13/42* (2013.01); *G01S 13/75* (2013.01); *G01S 13/758* (2013.01); *G01S 13/765* (2013.01); *G01S 13/787* (2013.01); *G01S 13/788* (2013.01); *G01S 13/9307* (2013.01)

(58) Field of Classification Search
CPC ... G01S 13/876; G01S 5/0072; G01S 13/765; G01S 13/787; G01S 13/788; G01S 13/9307; G01S 13/42; G01S 13/758; G01S 13/75; G01S 1/24; G01S 1/685; G01S 13/06
USPC .......................................... 342/41–51, 357.34
See application file for complete search history.

(56) References Cited

U.S. PATENT DOCUMENTS 7,272,495 B2 * 9/2007 Coluzzi et al. ................ 701/408
7,315,274 B2 * 1/2008 Fossum .......................... 342/44
(Continued)

FOREIGN PATENT DOCUMENTS

JP 61-70411 A 4/1986
JP 62-46383 U 3/1987

*Primary Examiner* — John B Sotomayor
*Assistant Examiner* — Marcus Windrich
(74) *Attorney, Agent, or Firm* — Global IP Counselors, LLP

(57) ABSTRACT

A radar device is provided. The radar device is installed in a movable body, transmits electromagnetic waves at a predetermined frequency, and receives response waves transmitted from a transponder device in response to the electromagnetic waves, respectively. The radar device includes a representative distance calculating module for calculating a representative distance from the radar device to the transponder device based on the response waves that are continuous over a predetermined azimuth angle range, a representative relative azimuth calculating module for calculating a representative relative azimuth of the transponder device from the radar device based on the continuous response waves, and a positioning module for calculating a location of the radar device based on positional information of the transponder device that is contained in each of the response waves, the calculated representative distance, and the calculated representative relative azimuth.

6 Claims, 19 Drawing Sheets

(51) Int. Cl.
*G01S 13/75* (2006.01)
*G01S 1/24* (2006.01)
*G01S 1/68* (2006.01)
*G01S 5/14* (2006.01)
*G01S 13/42* (2006.01)
*G01S 13/76* (2006.01)
*G01S 13/78* (2006.01)
*G01S 13/93* (2006.01)

(56) References Cited

U.S. PATENT DOCUMENTS

| | | | |
|---|---|---|---|
| 8,354,951 B2 * | 1/2013 | Guigne et al. | 342/33 |
| 2011/0037647 A1 * | 2/2011 | Tajima et al. | 342/357.26 |
| 2011/0140950 A1 * | 6/2011 | Andersson | 342/32 |
| 2011/0163908 A1 * | 7/2011 | Andersson et al. | 342/36 |
| 2013/0138314 A1 * | 5/2013 | Viittala et al. | 701/70 |
| 2013/0181858 A1 * | 7/2013 | Kojima et al. | 342/51 |

* cited by examiner

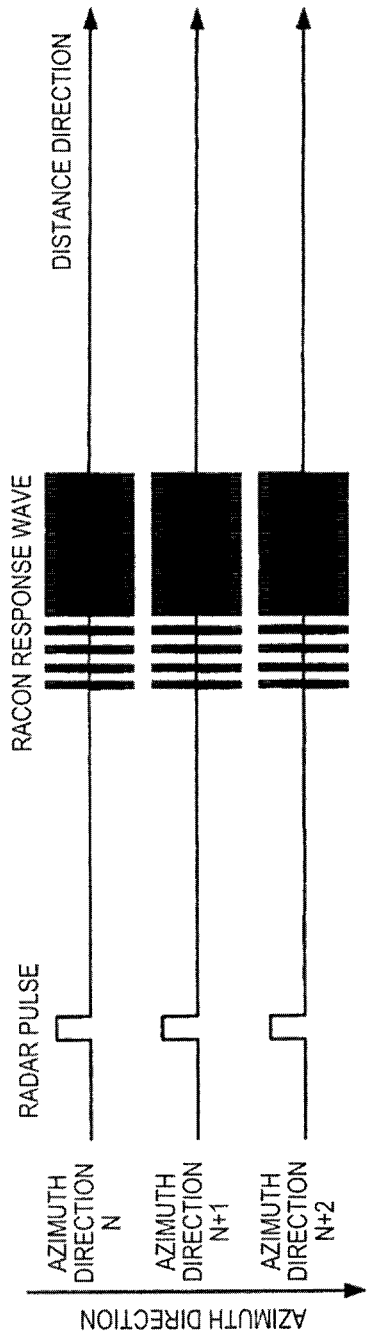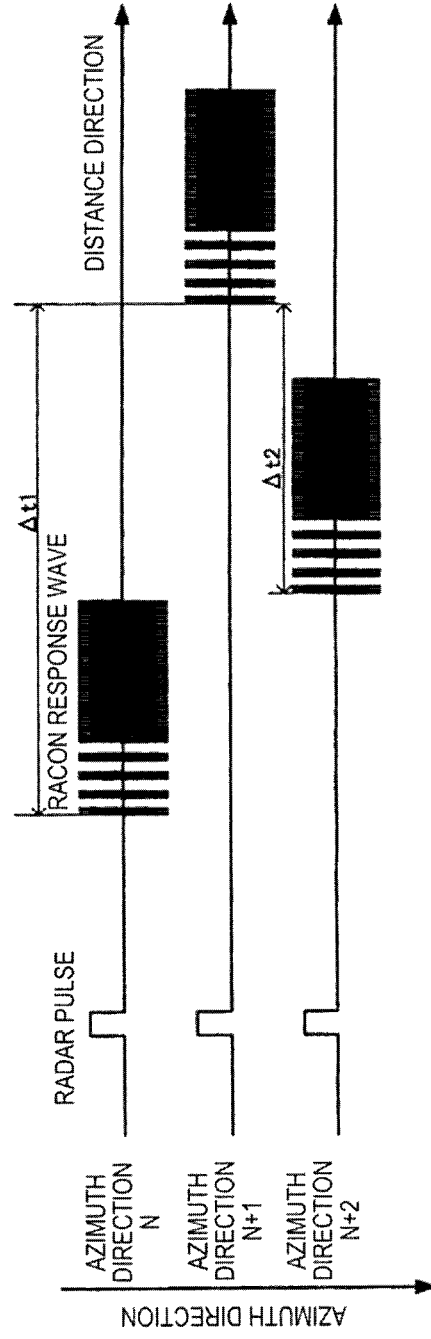

| POSITION OF N (RACON ON THE NORTH) COMPARED TO S IN EAST AND WEST DIRECTIONS / S (RACON ON THE SOUTH) | $R_1$ | $R_2$ |
|---|---|---|
| ON THE EAST OF S | SELECT CANDIDATE LOCATION ON THE NORTH | SELECT CANDIDATE LOCATION ON THE SOUTH |
| ON THE WEST OF S | SELECT CANDIDATE LOCATION ON THE SOUTH | SELECT CANDIDATE LOCATION ON THE NORTH |

FIG. 12A

| POSITION OF N (RACON ON THE NORTH) COMPARED TO S IN EAST AND WEST DIRECTIONS / S (RACON ON THE SOUTH) | $R_1$ | $R_2$ |
|---|---|---|
| ON THE EAST OF S | SELECT CANDIDATE LOCATION ON THE SOUTH | SELECT CANDIDATE LOCATION ON THE NORTH |
| ON THE WEST OF S | SELECT CANDIDATE LOCATION ON THE NORTH | SELECT CANDIDATE LOCATION ON THE SOUTH |

FIG. 12B

| RACON ID | RACON POSITIONAL INFORMATION ||
|---|---|---|
| | LATITUDE | LONGITUDE |
| 00001 | 34.5000 | 134.7000 |
| 00002 | 34.5100 | 134.7100 |
| ⋮ | ⋮ | ⋮ |

FIG. 19

RADAR DEVICE, RADAR POSITIONING SYSTEM, RADAR POSITIONING METHOD, AND COMPUTER READABLE MEDIA STORING RADAR POSITIONING PROGRAM

CROSS-REFERENCE TO RELATED APPLICATION(S)

The application claims priority under 35 U.S.C. §119 to Japanese Patent Application No. 2012-3964, which was filed on Jan. 12, 2012, the entire disclosure of which is hereby incorporated by reference.

TECHNICAL FIELD

The present invention relates to a radar device, a radar positioning system, a radar positioning method, and a computer readable media storing a radar positioning program that are installed in a movable body, such as a ship, and can calculate a location of the movable body efficiently using response waves which arc transmitted from a transponder device in response to radar waves.

BACKGROUND OF THE INVENTION

Conventionally, in order for surface ships to accurately acquire locations of themselves on a nautical chart and perform an automatic traveling (autopilot) using a ship autopilot controller, ships are generally introduced with a Global Navigation Satellite System (GNSS). GNSS is an inclusive term of "GPS" operated by U.S.A, "GALILEO" operated by Europe, and "GLONASS" opearted by Russia, etc. By introducing GNSS, locations (latitude and longitude) of the ships can be acquired accurately, each location of the ship can be displayed on the nautical chart, and the autopilot using the ship autopilot controller can be performed.

However, with GNSS, a situation may be caused where the location of the ship cannot be calculated and positioning accuracy degrades due to influence of electromagnetic waves emitted by solar flares and/or disturbance waves. The degradation of the positioning accuracy by GNSS will raise a problem of causing a sudden change of a course of the ship under the autopilot using the ship autopilot controller. Moreover, in a case where ships equipped with AISs (universal ship-borne Automatic Identification Systems) share information in the same ocean space through the AISs, a problem may arise that other ships misrecognize the location of the ship.

Therefore, it has been considered to calculate the ship location by using a positioning system for calculating the ship location utilizing buoys floating on the sea surface. For example, JP1987-046383U discloses an art for positioning, upon locking the buoys floating on the sea surface to fixed bases at the sea bottom and providing reflectors that reflect radar waves to the buoys, the current location of the ship by using a positional relation of each buoy with the ship and a positional relation of each buoy with each fixed bases based on a traveling period of time from a transmission of the radar wave from the ship until a reception of the radar wave after reflecting on the reflector (radar reflection wave) and the direction from which the radar reflection wave is received. Further, JP1986-070411A discloses an art for obtaining sufficient navigation calculation accuracy even in the deep water depth range by calculating a location of the system based on a loran radio wave received from a land base station, storing it in a storage, and providing a reference buoy that transmits a location stored in the storage to the ship.

However, the conventional arts represented by JP 1987-046383U and JP 1986-070411A are premised on a situation of reflecting a radar wave by a reflector installed in a buoy, and the positioning cannot be performed when the buoy is not installed with the reflector.

Recently, systems including radar beacons (hereinafter, referred to as "the racon") that transmit racon response waves to ships in response to radar waves are known. However, the conventional arts are inapplicable to this system because generally, a racon response wave is for displaying a racon mark on a PPI (Plan Position Indicator) screen so that a radar operator can visually confirm a location of the racon and not for calculating the location (latitude and longitude) thereof, and also because it is generally necessary to specify a reception time point of the racon response wave when finding a distance to the racon; however, a racon response wave is not simply a normal radar reflection wave but has a processing delay until a racon transmits the racon response wave after the reception of the radar wave, and it is difficult to specify the start of the reception time point of the racon response wave.

Thus, it has been an important subject to efficiently calculate a location of a ship by using a racon response wave that is transmitted from a racon in response to a radar wave. This subject is also produced similarly when other movable bodies other than ships perform a positioning using response waves transmitted from transponder device(s).

The present invention is made in view of the above situations, and it provides a radar device, a radar positioning system, a radar positioning method, and a computer readable media storing a radar positioning program that can calculate a location of a movable body efficiently using a response wave transmitted from a transponder device in response to a radar wave.

SUMMARY OF THE INVENTION

According to an aspect of the invention, a radar device is provided. The radar device is installed in a movable body, transmits electromagnetic waves at a predetermined frequency and receives response waves transmitted from a transponder device in response to the electromagnetic waves, respectively. The radar device includes a representative distance calculating module for calculating a representative distance from the radar device to the transponder device based on the response waves that are continuous over a predetermined azimuth angle range, a representative relative azimuth calculating module for calculating a representative relative azimuth of the transponder device from the radar device based on the continuous response waves, and a positioning module for calculating a location of the radar device based on positional information of the transponder device that is contained in each of the response waves, the calculated representative distance, and the calculated representative relative azimuth.

The radar device may further include an azimuth calculating module for calculating an azimuth of the movable body based on the calculated location of the radar device.

The radar device may further include a removing module for removing, when only below a predetermined number of the continuous response waves over the predetermined azimuth angle range are received, the received response waves.

The received response waves may be removed when a difference more than a predetermined threshold exists in reception timing between the response waves even if the predetermined or greater number of the continuous response waves over the predetermined azimuth angle range are received.

The predetermined threshold may be determined based on ranging accuracy of the radar device and accuracy of a response delay time length of the transponder device.

The removing module may remove the received response waves when the predetermined or greater number of continuous response waves includes a predetermined number of continuous reception waves having differences more than the predetermined threshold between their reception timings.

The representative distance calculating module may calculate the representative distance by using a time length obtained by subtracting a time length required for receiving a predetermined synchronizing signal contained in each of the response waves and a response delay time length from a time length between a transmission time point of each of the electromagnetic waves and a reception time point of the predetermined synchronizing signal.

The representative relative azimuth calculating module may calculate the representative relative azimuth as a relative azimuth from which a response wave arrives with the highest reception level among the response waves continuous over the predetermined azimuth angle range.

The representative relative azimuth calculating module may calculate the representative relative azimuth by estimating a relative azimuth from which the response wave arrives with the highest reception level among the received response waves, when the response wave that is not receivable is included in the response waves received continuously over the predetermined azimuth angle range.

The radar device may further include an azimuth acquiring module for acquiring an azimuth of the movable body. The positioning module calculates the location of the radar device as coordinates away from a reference location by the representative distance toward a direction opposite from an azimuth obtained by adding the representative relative azimuth to the acquired azimuth of the movable body, the reference location being coordinates indicated by the positional information of the transponder device.

The positioning module may include a candidate location calculating module for calculating a plurality of candidate locations based on positional information, representative distances, and representative relative azimuths of a plurality of transponder devices, and a selecting module for selecting the location of the radar device from the plurality of calculated candidate locations.

Among two, first and second candidate locations of the plurality of candidate locations calculated by the candidate location calculating module, the selecting module may select the first candidate location as the location of the radar device when a first relative azimuth difference corresponding to a difference in relative azimuth between first and second transponder devices with respect to a heading of the movable body at the first candidate location is substantially equal to a second relative azimuth difference corresponding to a difference in representative relative azimuth between the first and second transponder devices calculated by the representative relative azimuth calculating module.

Among two, first and second candidate locations of the plurality of candidate locations calculated by the candidate location calculating module, the selecting module may select the location of the radar device based on a positional relation in east-west or north-south directions between the first and second transponder devices by using characteristics of first and second transponder devices and the first and second candidate locations locating in quadrants, respectively, centering on an intersection point between a straight line connecting the first candidate location with the second candidate location and a straight line connecting the first transponder device with the second transponder device.

The selecting module may calculate an estimated location of the radar device based on the positional information, the representative distance, and the representative relative azimuth of at least one of the plurality of transponder devices, and the selecting module may select the closest candidate location to the estimate location among the calculated plurality of candidate locations as the location of the radar device.

The radar device may further include a determining module for determining whether the location of the radar device calculated by the positioning module is appropriate based on a positional relation between the calculated location of the radar device and a previously calculated location of the radar device, and a moving speed and a turning speed of the movable body.

According to another aspect of the invention, a radar positioning system is provided. The radar positioning system includes a radar device installed in a movable body and for transmitting electromagnetic waves and calculating a location of the radar device by using response waves from a transponder device, and the transponder device for receiving the electromagnetic waves and transmitting the response waves. The radar device includes a representative distance calculating module for calculating a representative distance from the radar device to the transponder device based on the response waves that are continuous over a predetermined azimuth angle range, a representative relative azimuth calculating module for calculating a representative relative azimuth of the transponder device from the radar device based on the continuous response waves, and a positioning module for calculating the location of the radar device based on positional information of the transponder device that is contained in each of the response waves, the calculated representative distance, and the calculated representative relative azimuth. The transponder device includes a response wave transmission processing module for transmitting the response wave containing at least either one of positional information of the transponder device and information with which the positional information of the transponder device is able to be identified, to the radar device in response to receiving the electromagnetic wave.

The response wave transmission processing module may transmit the response wave containing identification information indicating at least that the response wave is from the transponder device, and either one of the positional information of the transponder device and the information with which the positional information of the transponder device is able to be identified, to the radar device in response to receiving the electromagnetic wave.

According to another aspect of the invention, a radar positioning method is provided. The method uses a radar device installed in a movable body and for transmitting electromagnetic waves at a predetermined frequency and receiving response waves that are transmitted from a transponder device in response to the electromagnetic waves, respectively. The method includes calculating a representative distance from the radar device to the transponder device based on response waves that are continuous over a predetermined azimuth angle range, calculating a representative relative azimuth of the transponder device from the radar device based on the continuous response waves, and calculating a location of the radar device based on positional information of the transponder device that is contained in each of the response waves, the calculated representative distance, and the calculated representative relative azimuth.

According to another aspect of the invention, computer readable media configured to store a computer executable program in a non-transitory manner is provided. The computer readable media, upon execution by a processor of a computer, causes the computer to perform a positioning that is executed by a radar device installed in a movable body and for transmitting electromagnetic waves at a predetermined frequency and receiving response waves that are transmitted from a transponder device in response to the electromagnetic waves, respectively, according to a method. The method includes causing a computer to calculate a representative distance from the radar device to the transponder device based on response waves that are continuous over a predetermined azimuth angle range, causing a computer to calculate a representative relative azimuth of the transponder device from the radar device based on the continuous response waves, and causing a computer to calculate a location of the radar device based on positional information of the transponder device that is contained in each of the response waves, the calculated representative distance, and the calculated representative relative azimuth.

According to the above aspects of the invention, the representative distance and the representative relative azimuth of the transponder device from the radar device are calculated based on the continuous response waves over the predetermined azimuth angle range, and the location of the radar device is calculated based on the positional information, the representative distance, and the representative relative azimuth of the transponder device are calculated. Thus, the location of the movable body can be calculated efficiently using the response waves which are transmitted from the transponder device in response to the electromagnetic waves. Therefore, in an area where transponder devices are installed, such as major routes close to narrow water channels or land, even if positioning accuracy of a global positioning system degrades, the location of a ship can be displayed on a nautical chart, and a stable autopilot using a ship autopilot controller can be implemented.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 5A and 5B are views for illustrating reception timings of racon response waves;

FIGS. 12A and 12B are tables showing examples of a selection of the ship location;

FIG. 19 is a table showing an example of a racon positional information database.

DETAILED DESCRIPTION

Hereinafter, a suitable embodiment of a radar device, a radar positioning system, a radar positioning method, and a radar positioning program according to the present invention are described in detail with reference to the accompanying drawings. In the embodiment, a case where the present invention is applied to a radar device installed in a surface ship is described.

Ship Radar Positioning System

Figure 1:
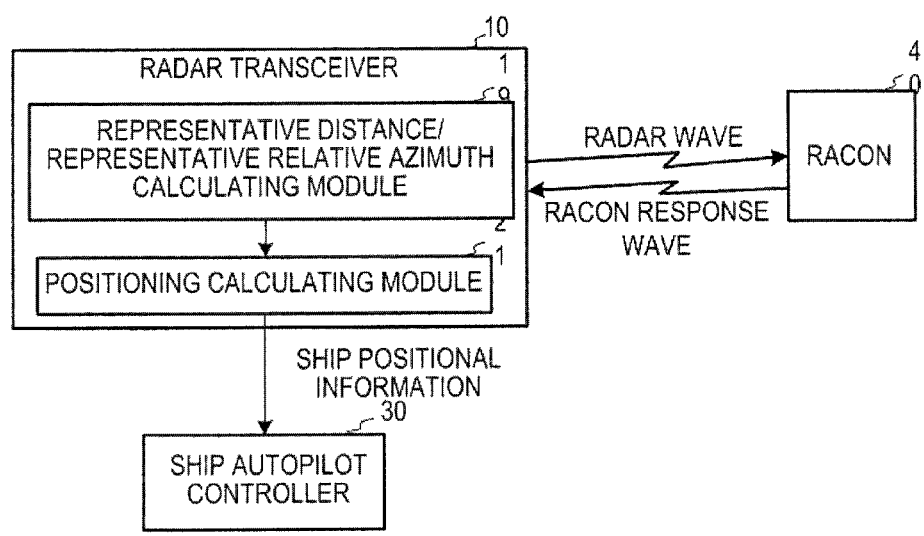
FIG. 1 is a diagram for schematically illustrating a ship radar positioning system according to one embodiment of the present invention.

First, a ship radar positioning system according to this embodiment is schematically described. FIG. 1 is a diagram for schematically illustrating the ship radar positioning system. Here, a case is described where a ship traveling a narrow water channel or the like calculates a location of itself by using racon response waves from one or more racons provided within an ocean area corresponding to the water channel.

As shown in FIG. 1, the ship radar positioning system includes a radar transceiver 10 installed in the ship, and a racon 40 serving as a transponder device. The radar transceiver 10 corresponds to the radar device described in the claims.

This ship radar positioning system is characterized in that it calculates the ship location by using radar responses transmitted from the racon 40 and does not identify the ship position by positional information (latitude and longitude) acquired from GNSS.

Specifically, when the radar transceiver 10 transmits radar waves throughout all directions around the ship)(360°), the racon 40 is activated when it receives the radar wave and transmits a racon response wave to the radar transceiver 10. Here, the racon response wave contains racon discrimination information indicating that it is a racon response wave, and positional information of the racon 40 (hereinafter, referred to as "the racon positional information"). Note that, the racon discrimination information only indicates that it is a racon response wave and differs from a racon ID that identifies the racon uniquely (described later). The racon positional information shows the location of the racon, such as its latitude and longitude.

When a representative distance/representative relative azimuth calculating module 19 of the radar transceiver 10 receives the racon response waves, it calculates a representative distance and a representative relative azimuth of the racon 40 from the radar transceiver 10 to the racon 40 using the racon response waves. Then, a positioning calculating module 21 uses the calculated representative distance and representative relative azimuth, and the racon positional information contained in the racon response wave to calculate the location (latitude and longitude) of the radar transceiver 10 and output, to a ship autopilot controller 30, the positional information of the radar transceiver 10 obtained as the calculation result. The detailed description of the representative distance/representative relative azimuth calculating module 19 and the positioning calculating module 21 is described later.

The ship autopilot controller 30 automatically controls the ship to travel based on the positional information outputted from the positioning calculating module 21. Specifically, the ship autopilot controller 30 compares a predetermined route with the ship location and performs a steering control so that the ship is located on the route.

Thus, the radar transceiver 10 calculates the representative distance and the representative relative azimuth of the racon 40 based on the racon response waves, and calculates the location of the radar transceiver 10 by using the calculated representative distance and representative relative azimuth, and the racon positional information. Therefore, the ship location can be calculated efficiently without depending on GNSS.

Figure 2:
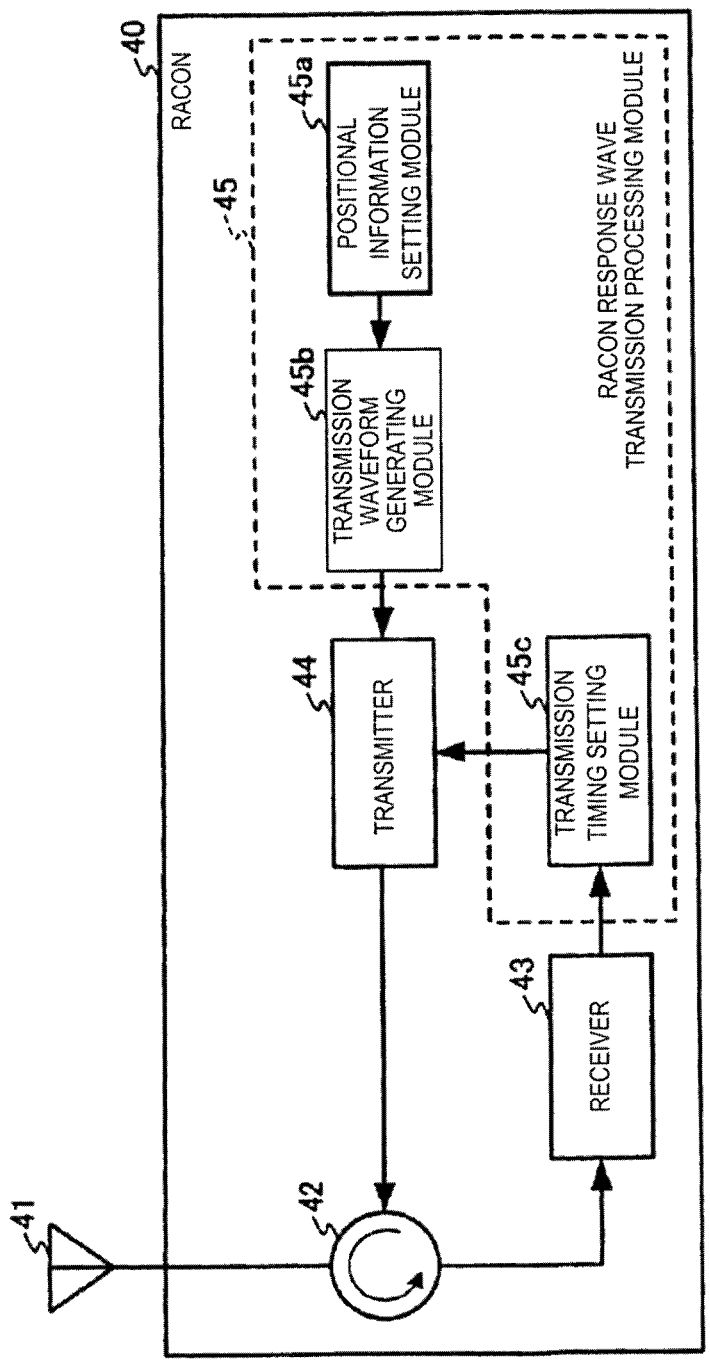
FIG. 2 is a block diagram showing a configuration of a racon shown in FIG. 1.

Next, a specific configuration of the racon 40 shown in FIG. 1 is described. FIG. 2 is a block diagram showing a configuration of the racon 40 shown in FIG. 1. As shown in FIG. 2, the racon 40 includes an antenna unit 41, a circulator 42, a receiver 43, a transmitter 44, and a racon response wave transmission processing module 45. Here, for the convenience in the description, a case where the racon 40 is realized using ASIC or FPGA is described.

The antenna unit 41 receives the radar wave and outputs it to the circulator 42, and transmits the racon response wave outputted from the circulator 42. In this embodiment, although the transmission and the reception are performed by using the antenna unit 41, it may be separated to be a transmission antenna unit and a reception antenna unit.

The circulator 42 is a three-port circulator connected with the antenna unit 41, the receiver 43, and the transmitter 44. By the circulator 42, the radar wave outputted from the antenna unit 41 is outputted to the receiver 43 and the racon response wave outputted from the transmitter 44 is outputted to the antenna unit 41.

The receiver 43 amplifies the radar wave outputted from the circulator 42, and outputs it to the racon response wave transmission processing module 45. The transmitter 44 up-converts to amplify the signal with a transmission waveform generated by the racon response wave transmission processing module 45 to a predetermined RF (Radio Frequency) band so as to generate the racon response wave, and outputs the generated racon response wave to the circulator 42 at a timing corresponding to a transmission trigger generated by the racon response wave transmission processing module 45.

The racon response wave transmission processing module 45 generates the racon response wave and performs transmission processing on the generated racon response wave. The racon response wave transmission processing module 45 includes a positional information setting module 45a, a transmission waveform generating module 45b, and a transmission timing setting module 45c.

The positional information setting module 45a outputs the racon positional information indicating the latitude and longitude of the racon 40 to the transmission waveform generating module 45b. The racon positional information is given to the racon response wave so as to use the latitude and longitude of the racon 40 as a reference location in calculating the ship location by the radar transceiver 10.

The transmission waveform generating module 45b generates the transmission waveform of the racon response wave. The transmission waveform generating module 45b adds a signal series corresponding to the racon positional information outputted from the positional information setting module 45a to a predetermined signal series (racon discrimination information) serving as a preamble indicating that it is a racon response wave. Then, the transmission waveform generating module 45b modulates it using a predetermined scheme to generate the transmission waveform of the racon response wave. The ASK (Amplitude Shift Keying) modulation, the FSK (Frequency Shift Keying) modulation, the PSK (Phase Shift Keying) modulation or the like may be used in the modulation.

Figure 3:
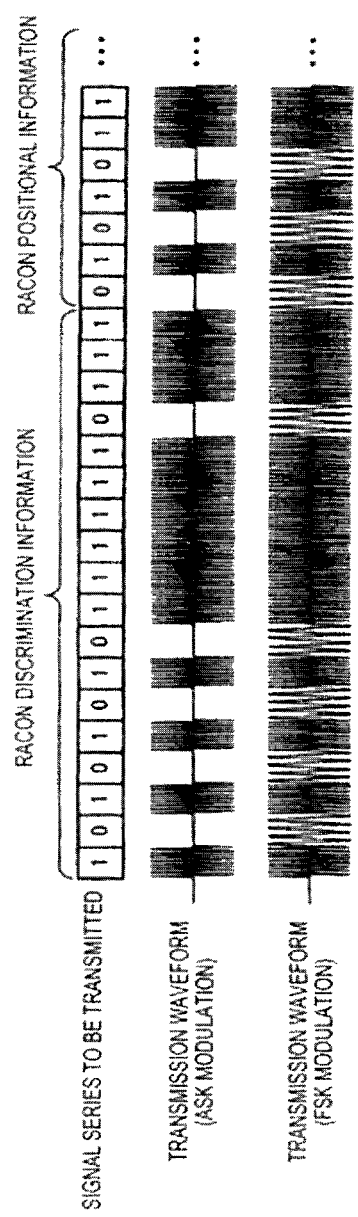
FIG. 3 is a view showing examples of a transmission waveform generated by a transmission waveform generating module shown in FIG. 2.

FIG. 3 is a view showing examples of a transmission waveform generated by the transmission waveform generating module 45b shown in FIG. 2. As shown in FIG. 3, the signal series in the transmission waveform is a binary code sequence of "0" and "1" indicating the racon discrimination information and the racon positional information. When the binary code sequence is ASK modulated, a transmission waveform having amplitude "0" within the range corresponding to "0" in the binary code sequence and a predetermined amplitude within the range corresponding to "1" in the binary code sequence is obtained. On the other hand, when the signal series of the binary code sequence is FSK modulated, a transmission waveform having different pulse frequencies between the range corresponding to "0" in the binary code sequence and the range corresponding to "1" in the binary code sequence is obtained.

Therefore, to extract the racon discrimination information and the racon positional information from the transmission waveform acquired through the ASK modulation, the difference in amplitude is to be detected, and to extract the racon discrimination information and the racon positional information from the transmission waveform acquired through the FSK modulation, the difference in frequency is to be detected.

Note that, although the illustration is omitted for the convenience in the description, when the signal series of the binary code sequence is PSK modulated, the transmission waveform with different phases between the range corresponding to "0" of the binary code sequence and the range corresponding to "1" of the binary code sequence is acquired. Therefore, to extract the racon discrimination information and the racon positional information from the transmission waveform acquired through the PSK modulation, the difference in frequency is to be detected. Here, although the case where the binary code sequence is used is described, a multilevel code sequence that takes three or more values may also be used.

The transmission timing setting module 45c detects the edge in falling or rising of the radar pulse contained in the radar wave, generates the transmission trigger of the racon response wave after a predetermined period of time from the detected edge, and outputs it to the transmitter 44.

Figure 4:
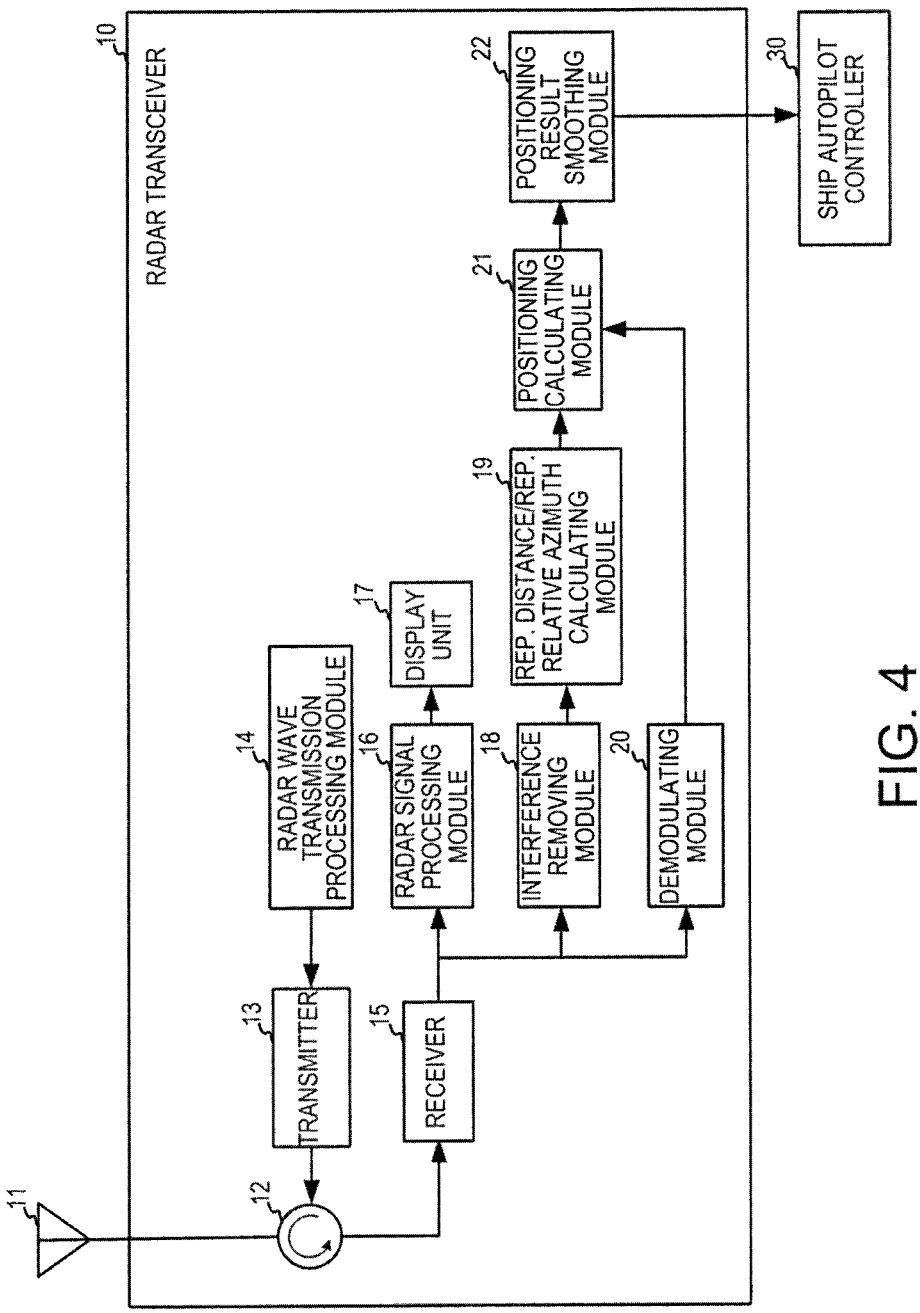
FIG. 4 is a block diagram showing a specific configuration of a radar transceiver shown in FIG. 1.

Next, a specific configuration of the radar transceiver 10 shown in FIG. 1 is described. FIG. 4 is a block diagram showing the specific configuration of the radar transceiver 10. Here, for the convenience in the description, a case where the radar transceiver 10 is realized using ASIC or FPGA is described.

As shown in FIG. 4, the radar transceiver 10 includes an antenna unit 11, a circulator 12, a transmitter 13, a radar wave transmission processing module 14, a receiver 15, a radar signal processing module 16, a display unit 17, an interference removing module 18, the representative distance/representative relative azimuth calculating module 19, a demodulating module 20, the positioning calculating module 21, and a positioning result smoothing module 22.

The antenna unit 11 transmits radar waves outputted from the circulator 12, receives antenna reception waves containing radar echoes and racon response waves and outputs them to the circulator 12. In this embodiment, although the transmission and the reception are performed by the antenna unit 11, it may be separated to be a transmission antenna unit and a reception antenna unit. The antenna unit 11 transmits radar waves throughout all directions around the ship (360°) while revolving and receives antenna reception waves therefrom while revolving.

The circulator 12 is a three-port circulator connected with the transmitter 13, the antenna unit 11, and the receiver 15. The radar waves outputted from the transmitter 13 are outputted to the antenna unit 11 by the circulator 12 and the antenna reception waves outputted from the antenna unit 11 are outputted to the receiver 15.

The transmitter 13 generates each radar wave by up-converting to amplify a transmission waveform generated by the radar wave transmission processing module 14 to a predetermined RF band, and outputs the radar wave to the circulator 12. The radar wave transmission processing module 14 generates the transmission waveform of a radar pulse comprised of a frequency modulated pulse, and outputs the transmission waveform to the transmitter 13.

The receiver 15 amplifies the antenna reception waves outputted from the antenna unit 11, and outputs them to the radar signal processing module 16, the interference removing module 18, and the demodulating module 20.

The radar signal processing module 16 draws a radar image and racon mark(s) to the display unit 17 based on the antenna reception waves outputted from the receiver 15. Since the antenna reception waves contain the radar echoes and the racon response wave(s), the radar image is drawn based on the radar echoes, and the racon mark(s) are drawn based on the racon response waves.

Specifically, each radar echo contained in the antenna reception waves is a signal in an Rθ coordinate system indicating a distance R from the radar transceiver 10 to land or another ship which reflected the radar wave, and a relative azimuth θ of the land or the other ship which reflected the radar wave from the radar transceiver 10. The radar signal processing module 16 converts the signal in the Rθ coordinate system into a signal in an XY coordinate system, and transfers it to the display unit 17 to draw the radar image on a PPI screen of the display unit 17. A display position of the racon response wave contained in the antenna reception waves is specified similarly to the radar echo, and a racon mark is displayed at the specified display position. Note that, in this embodiment, since the indication on the PPI screen is commonly used, the detailed description thereof is omitted.

The display unit 17 displays the radar image and racon mark(s). As for the display unit 17, a PPI scope for two-dimensionally displaying locations of objects by a scanning line revolving within a circular display area may be used. Further, a nautical chart may also be displayed on the display unit 17, and the ship location obtained as the positioning result can be superimposed on the nautical chart to be displayed on the display unit 17.

The interference removing module 18 removes the racon response wave transmitted in response to the radar wave transmitted from a radar transceiver of another ship among the racon response waves contained in the antenna reception waves outputted from the receiver 15. This is because the racon 40 is activated upon receiving the radar wave and transmits a racon response wave also when the received radar wave is from a radar transceiver installed in another ship. Therefore, the interference removing module 18 removes the racon response wave caused by the radar wave transmitted from the radar transceiver installed in the other ship, as an interference wave. As a result, only the racon response waves caused by the radar wave transmitted from the radar transceiver 10 are outputted to the representative distance/representative relative azimuth calculating module 19.

Specifically, when over a predetermined number of racon response waves outputted from the receiver 15 cannot be received continuously over a predetermined azimuth angle range, the interference removing module 18 determines that the received racon response waves are caused by radar waves transmitted from radar transceivers installed in other ships, and it removes the racon response waves.

Based on the racon response waves from which the interference waves are removed by the interference removing module 18, the representative distance/representative relative azimuth calculating module 19 calculates the representative distance indicating the relative distance of the racon 40 from the radar transceiver 10 and the representative relative azimuth indicating the relative azimuth of the racon 40 from the radar transceiver 10.

Specifically, the representative distance/representative relative azimuth calculating module 19 calculates the representative distance from the radar transceiver 10 to the racon 40 by using the racon response waves continuous over the predetermined azimuth angle range. However, when calculating the representative distance, it is difficult to accurately obtain a reception starting time point of each racon response wave by the radar transceiver 10. Therefore, a time point at which the racon discrimination information contained in the racon response wave is received is obtained, then the reception starting time point of the racon response wave is calculated by subtracting a time length required for receiving the racon discrimination information and a response delay time length due to the racon 40 from the reception time point of the racon discrimination information, and the representative distance is calculated using the reception starting time point of the racon response wave and the transmission time point of the corresponding radar wave.

The representative distance/representative relative azimuth calculating module 19 calculates the representative relative azimuth of the racon 40 from the radar transceiver 10 by using the racon response waves continuous over the predetermined azimuth angle range. In calculating the representative relative azimuth, among the racon response waves continuous over the predetermined azimuth angle range, the relative azimuth from which the racon response wave with the highest reception level (signal intensity) arrives is defined as the representative relative azimuth.

However, when one or more non-receivable racon response waves exist between receivable racon response waves, the relative azimuth considered to have the highest reception level is estimated and it is defined as the representative relative azimuth. In the estimation, a method of obtaining the maximum point by performing a curve approximation using the received racon response waves or a method of estimating the maximum point based on a temporary representative relative azimuth described later may be used. The calculations of the representative distance and the representative relative azimuth are described later in detail.

The demodulating module 20 performs demodulation processing on each racon response wave contained in the antenna reception waves outputted from the receiver 15 by using a demodulation scheme corresponding to the modulation scheme of the racon 40. The racon discrimination information and the racon positional information which are contained in the racon response wave are extracted by the demodulation processing. The demodulating module 20 outputs the extracted racon positional information to the positioning calculating module 21.

The positioning calculating module 21 calculates the locations (latitude and longitude) of the radar transceiver 10 by using the representative distance and the representative relative azimuth outputted from the representative distance/representative relative azimuth calculating module 19 and the racon positional information outputted from the demodulating module 20, and the positioning calculating module 21 outputs the positional information obtained as the calculation result to the positioning result smoothing module 22.

Specifically, when only the positional information of a single racon is acquired, the positioning calculating module 21 uses the positional information, the representative distance, and the representative relative azimuth of the racon to calculate the location of the radar transceiver 10, and when the positional information of two racons is acquired, the positioning calculating module 21 uses the positional information of the two racons, and the representative distances and the representative relative azimuths of the two racons to calculate the location of the radar transceiver 10. Further, when the positional information of three or more racons is acquired, the positional information of two of the three or more racons is selected, and the location of the radar transceiver 10 is calculated using the positional information, the representative distances, and the representative relative azimuths of the two selected racons. Note that, in the selection, to reduce an error in the positioning, the racons that respectively make an angle of close to 90° with the radar transceiver 10 and of which the representative distances are closer to the radar transceiver 10 among the three of more racons are selected. Note that, this processing by the positioning calculating module 21 is described later in detail.

The positioning result smoothing module 22 determines the propriety of the positional information outputted from the positioning calculating module 21, performs smoothing processing on the positional information when it is appropriate positional information, and outputs the smoothened positional information to the ship autopilot controller 30 as ship positional information. The propriety of the positional information is determined because the positional information which is inappropriate in view of a previous location of the radar transceiver 10, a traveling speed and a turning speed of the ship should not be adopted as the positioning result. Moreover, the smoothing processing is performed because it is desired to recognize the current location of the radar transceiver 10 based on the previous positional information of the ship. Here, although the propriety is determined after the positioning result is obtained, it may be performed simultaneously to the calculation of the location of the radar transceiver 10. Note that, the positioning result smoothing module 22 is described later in detail.

Next, the processing by the interference removing module 18 shown in FIG. 4 is described in further detail. The interference removing module 18 determines whether the racon response waves contained in the antenna reception waves outputted from receiver 15 are continuous over the predetermined azimuth angle range, and if the result is no, it removes the racon response waves as interference waves.

Specifically, the interference removing module 18 uses the azimuth corresponding to the turning angle of the antenna unit 11 at the time of receiving the antenna reception wave to determine whether the racon response waves are continuous over the predetermined azimuth angle range. For example, under a condition that three racon response waves continue over the predetermined azimuth angle range, if three antenna reception waves received at three azimuths starting from an azimuth N to an azimuth N+2 all contain the racon response waves, the racon response waves are determined as racon response waves caused by the radar waves transmitted from the radar transceiver 10. On the other hand, if at least one of the three antenna reception waves received at three azimuths starting from the azimuth N to the azimuth N+2 does not contain a racon response wave, the one or two racon response wave contained in the antenna reception waves are determined as interference waves.

Moreover, the interference removing module 18 determines whether the racon response waves are interference waves by using the reception timings thereof in addition to whether the racon response waves continue over the predetermined angle range. FIGS. 5A and 5B are views for illustrating reception timings of racon response waves, in which FIG. 5A shows the case where the racon response waves caused by the radar waves of the ship are received. With the racon response waves caused by the radar waves of the ship, the appearing positions of the racon response waves are substantially the same when having the radar pulse contained in each radar wave as a reference.

On the other hand, FIG. 5B shows the case where the racon response waves caused by the radar waves from other ships are received. With the racon response waves caused by the radar waves from the other ships, a difference is produced in reception timing of the racon response wave from each azimuth. FIG. 5B shows a situation where the reception timing of the racon response wave at the azimuth N and the reception timing of the racon response wave at the azimuth N+1 have a difference of $\Delta t1$ therebetween, and the reception timing of the racon response wave at the azimuth N+1 and the reception timing of the racon response wave at the azimuth N+2 have a difference of $\Delta t2$ therebetween.

Such difference is produced because in many cases, other ships transmit radar waves asynchronously to the transmissions of radar waves from the ship, different from when receiving racon response waves caused by the radar waves from the ship.

In such a case, the interference removing module 18 compares the change amounts $\Delta t1$ and $\Delta t2$ in the reception timing of the racon response wave with a threshold T, and if at least one of the change amounts $\Delta t1$ and $\Delta t2$ exceeds the threshold T, the interference removing module 18 determines that the racon response waves are racon response waves caused by the radar waves from other ships.

Note that, the threshold T is set based on the change amount in the reception timing of the racon response wave caused by the radar wave from the ship. This is because, even when the radar waves are transmitted from the ship, a difference is produced by a traveling of the ship, a change amount in PRI (Pulse Repetition Interval), ranging accuracy of the radar, accuracy of a response delay time length of the racon, etc. When the racon response wave caused by the radar wave from the other ship is received, the change amount of the reception timing thereof changes greatly exceeding the threshold T.

When the change amount of the reception timing of the racon response wave exceeds the threshold T continuously for a predetermined number of times, the interference removing module 18 removes the corresponding series of racon response waves as interference waves. In FIG. 5B, the continuous predetermined number of times is two, and when Δt1 and Δt2 are both above the threshold T, all the racon response waves received at azimuths N to N+2 are removed as interference waves.

Thus, even when racon response waves are received continuously over the predetermined azimuth angle range, if the change amount of the reception timing of the racon response wave continuously exceeds the threshold T for the predetermined number of times, the interference removing module 18 determines the racon response waves are interference waves and removes them. By this processing, the interference removing module 18 outputs the racon response waves that continue over the predetermined azimuth angle range and the change amount of the reception timings thereof becomes below the threshold T, as racon response waves caused by the radar waves from the ship.

Figure 6:
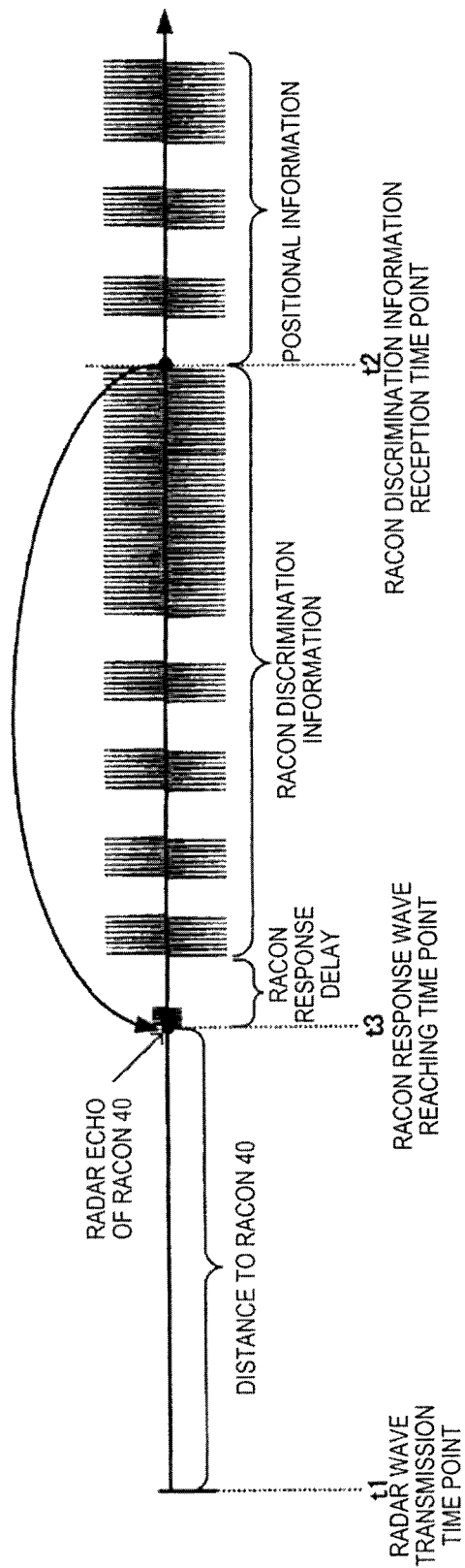
FIG. 6 is a view for illustrating a calculation of a representative distance performed by a representative distance/representative relative azimuth calculating module shown in FIG. 4.

Next, the calculation of the representative distance by the representative distance/representative relative azimuth calculating module 19 shown in FIG. 4 is described further in detail. FIG. 6 is a view for illustrating the calculation of the representative distance performed by the representative distance/representative relative azimuth calculating module 19 shown in FIG. 4. Here, the radar transceiver 10 transmits the radar wave at a time point t1.

As shown in FIG. 6, when the representative distance/ representative relative azimuth calculating module 19 receives the racon response wave, it detects the racon discrimination information contained in the racon response wave by using a pattern matching or the like, and specifies the reception time point (time point t2) of the racon discrimination information. Then, the representative distance/representative relative azimuth calculating module 19 subtracts the time length required for receiving the racon discrimination information and the time length of the racon response delay by the racon 40 are from the time point t2 to calculate a time point t3 indicating a reaching time point of the racon response wave. Note that, the time length corresponding to the racon response delay is processing time length required between the reception of the racon 40 and the transmission of the racon response wave.

Further, a time difference (t3−t1) between the transmission time point of the radar wave (t1) and the reaching time point of the racon response wave (t3) is multiplied by the traveling speed of the radar wave to correspond to the relative distance from the radar transceiver 10 to the racon 40, and then divided by two for a round trip so as to calculate the representative distance from the radar transceiver 10 to the racon 40.

Next, the calculation of the representative relative azimuth by the representative distance/representative relative azimuth calculating module 19 shown in FIG. 4 is described in detail. As being described above, the representative distance/representative relative azimuth calculating module 19 defines a representative relative azimuth as the azimuth at the time point of receiving the racon response wave with the highest reception level among the racon response waves which are continuous over the predetermined azimuth angle range.

Figure 7:
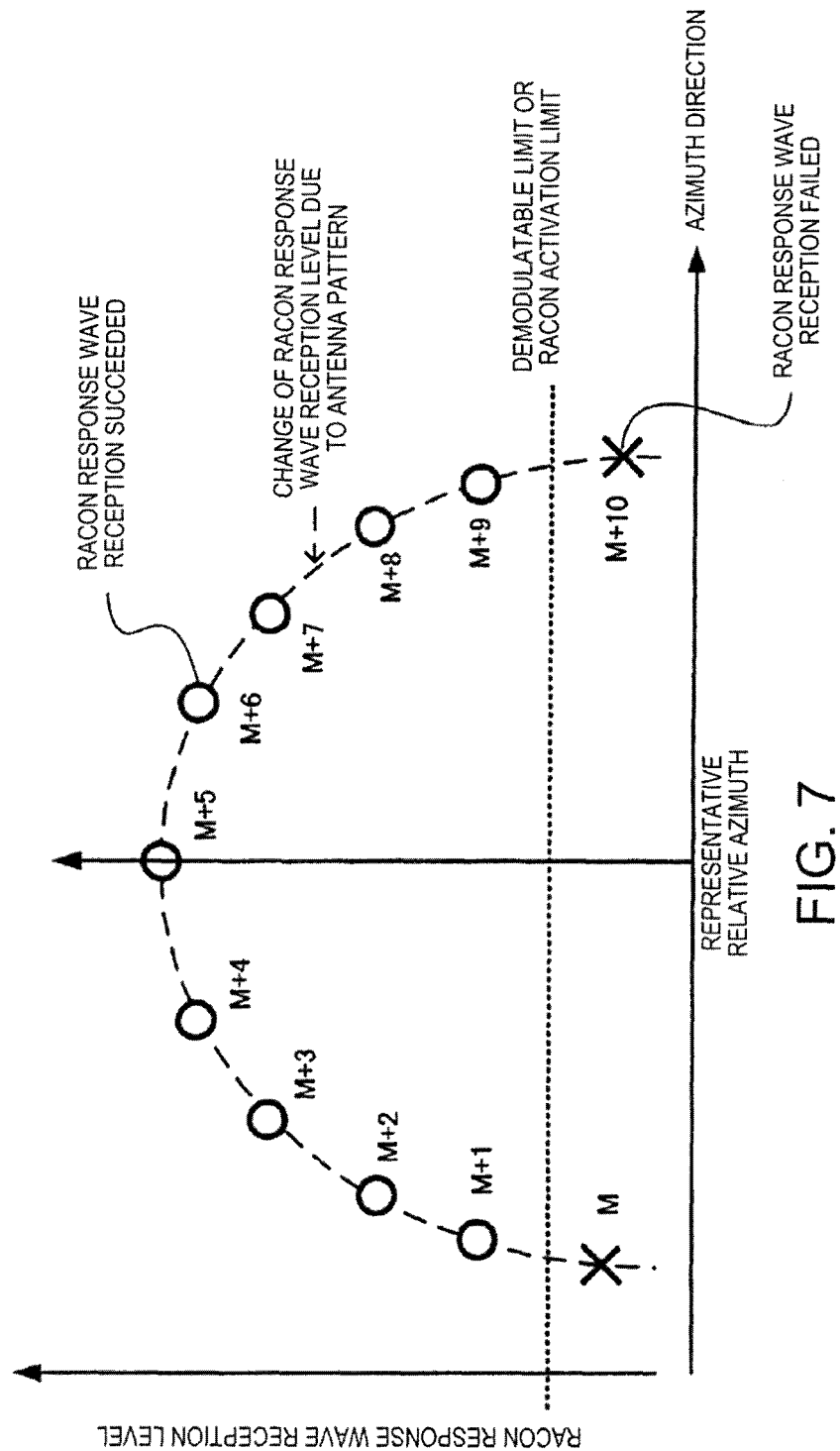
FIG. 7 is a view showing an example of a situation where racon response waves are received continuously over a predetermined azimuth angle range.

FIG. 7 is a view showing an example of a situation where racon response waves are received continuously over the predetermined azimuth angle range. Here, a state where the racon response waves are successfully received within an angle range from an azimuth M+1 to an azimuth M+9. The reception level of the racon response wave changes depending on the azimuth because the antenna unit 11 has a characteristic (antenna pattern) of directivity.

Moreover, the racon response wave is failed to be received at azimuths M and M+10 because the racon response wave reception level falls below a demodulatable limit or the radar wave reception level when the racon 40 receives the radar wave falls below a racon activation limit. Note that, the demodulatable limit is a minimum value of the racon response wave reception level with which the demodulation can be performed by the demodulating module 20, and the racon activation limit is a minimum value of the radar wave reception level required for the racon 40 to transmit the racon response wave.

As shown in FIG. 7, between the azimuth M+1 and the azimuth M+9, the racon response wave reception level reaches the maximum at the azimuth M+5. Therefore, the representative distance/representative relative azimuth calculating module 19 defines the representative relative azimuth as the azimuth M+5.

Here, as shown in FIG. 7, when all the racon response waves continuous over the predetermined azimuth angle range are received, the representative relative azimuth can be obtained comparatively easily, but there is a case where the reception level falls below the demodulatable limit or the racon activation limit, and the racon response wave cannot be received even though it can originally be received. This is because there are possibilities of the racon response wave being interference due to the radar wave from another ship or the racon 40 being unable to respond because of saturation.

Figure 8:
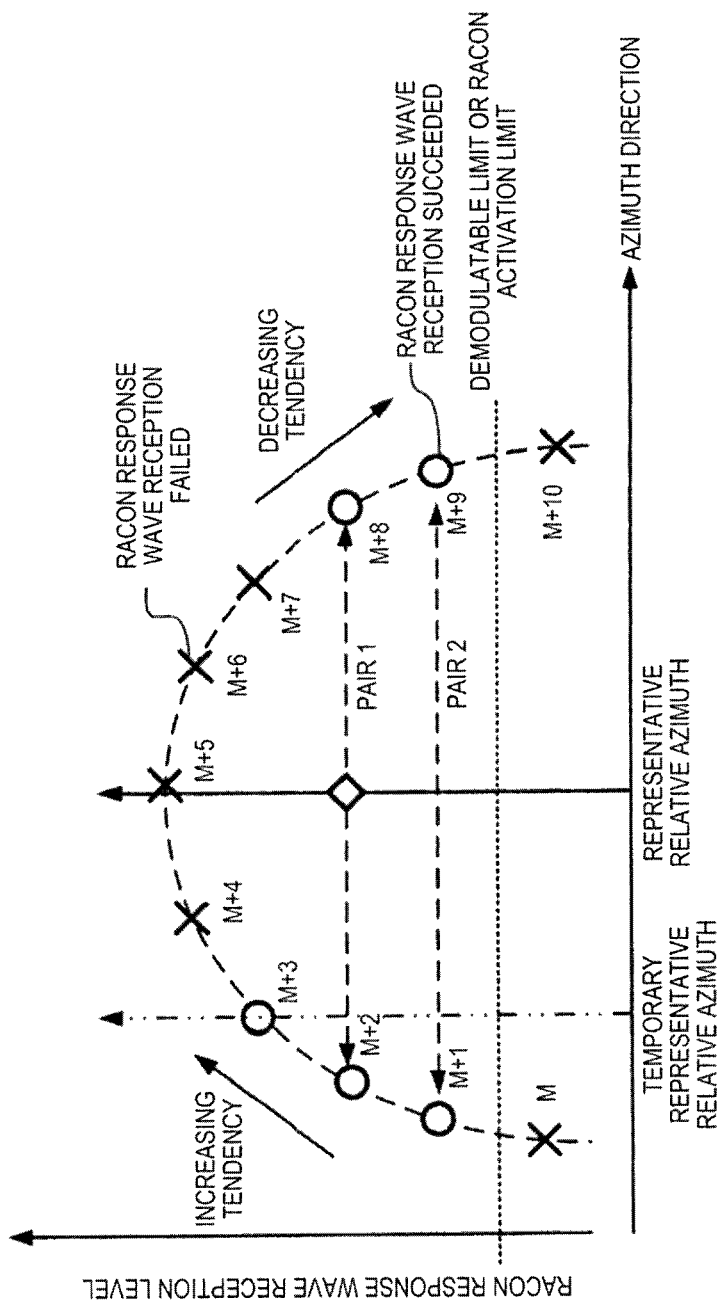
FIG. 8 is a view showing an example when racon response waves that are originally receivable but cannot be received exist.

FIG. 8 is a view showing an example when racon response waves that are originally receivable but cannot be received exist. Here, a case is shown where the racon response waves are successfully received continuously from the azimuth M1 to the azimuth M+3, failed to be received from the azimuth M+4 to the azimuth M+7, and successfully received from the azimuth M+8 to the azimuth M+9 is described. Further, the racon response wave reception level increases from M+1 to M+3 and decreases from M+8 to M+9.

In such a case, among the received racon response waves, the representative relative azimuth with the maximum reception level is estimated. Specifically, between the azimuths M+1 and M+3 where the racon response wave reception levels have an increasing tendency, the azimuth M+3 at which the racon response wave reception level reaches the maximum is defined to be a temporary representative relative azimuth.

Then, when the racon response waves at the azimuths M+8 and M+9 are successfully received, a pair of racon response waves having the similar extent of reception levels is formed. In the example shown in FIG. 8, the racon response waves at the azimuths M+2 and M+8 serve as a pair, and the racon response waves at the azimuths M+1 and M+9 serve as a pair.

The pair with higher reception level of the racon response waves between the two pairs is the pair with the racon response waves at the azimuths M+2 and M+8. Thus, the representative distance/representative relative azimuth calculating module 19 defines the representative relative azimuth as the intermediate azimuth between the azimuths M+2 and M+8.

Thus, by forming the pair with the racon response waves with the similar extent of reception levels to determine the representative relative azimuth, even if the racon response wave at the azimuth M+5 of which reception level is supposed to be the highest cannot be received for some reason, an appropriate representative relative azimuth can be determined. Note that, when the racon response waves having a decreasing tendency in their reception levels cannot be received within a predetermined azimuth range after the temporary representative relative azimuth is determined, the temporary representative relative azimuth is defined to be the representative relative azimuth.

Figure 9:
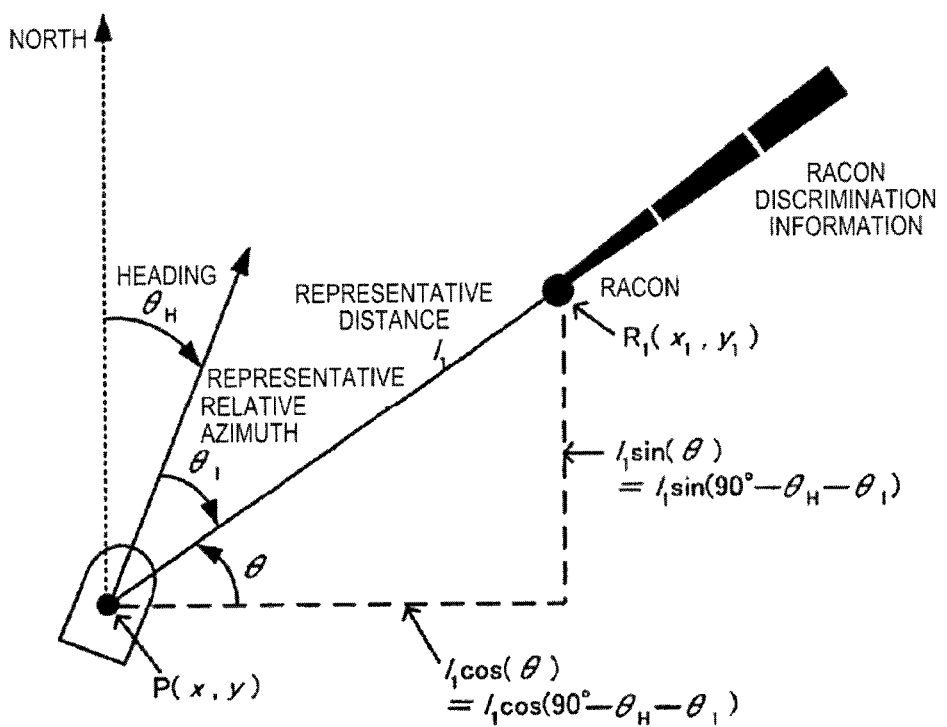
FIG. 9 is a view for illustrating processing by a positioning calculating module when positional information of one racon exists.

Next, the processing by the positioning calculating module 21 shown in FIG. 4 is described further in detail. First, the case where the positional information of one racon exists is described. FIG. 9 is a view for illustrating the processing by the positioning calculating module 21 when the positional information of one racon exists.

As shown in FIG. 9, the positioning calculating module 21 calculates a position $P(x, y)$ of the ship based on the following equation using the representative distance $1_1$ and the representative relative azimuth $\theta_1$ calculated by the representative distance/representative relative azimuth calculating module 19, the racon positional information $R_1(x_1, y_1)$ outputted from the demodulating module 20, and a heading $\theta_H$ of the ship.

$$\begin{cases} x = x_1 - l_1\cos(90° - \theta_H - \theta_1) \\ y = y_1 - l_1\sin(90° - \theta_H - \theta_1) \end{cases} \quad (1)$$

Note that, the heading $\theta_H$ of the ship is an angle taken by having a clockwise direction as positive with reference to north, and the representative relative azimuth $\theta_1$ is an angle taken by having the clockwise direction as positive with reference to the heading of the ship.

Figure 10:
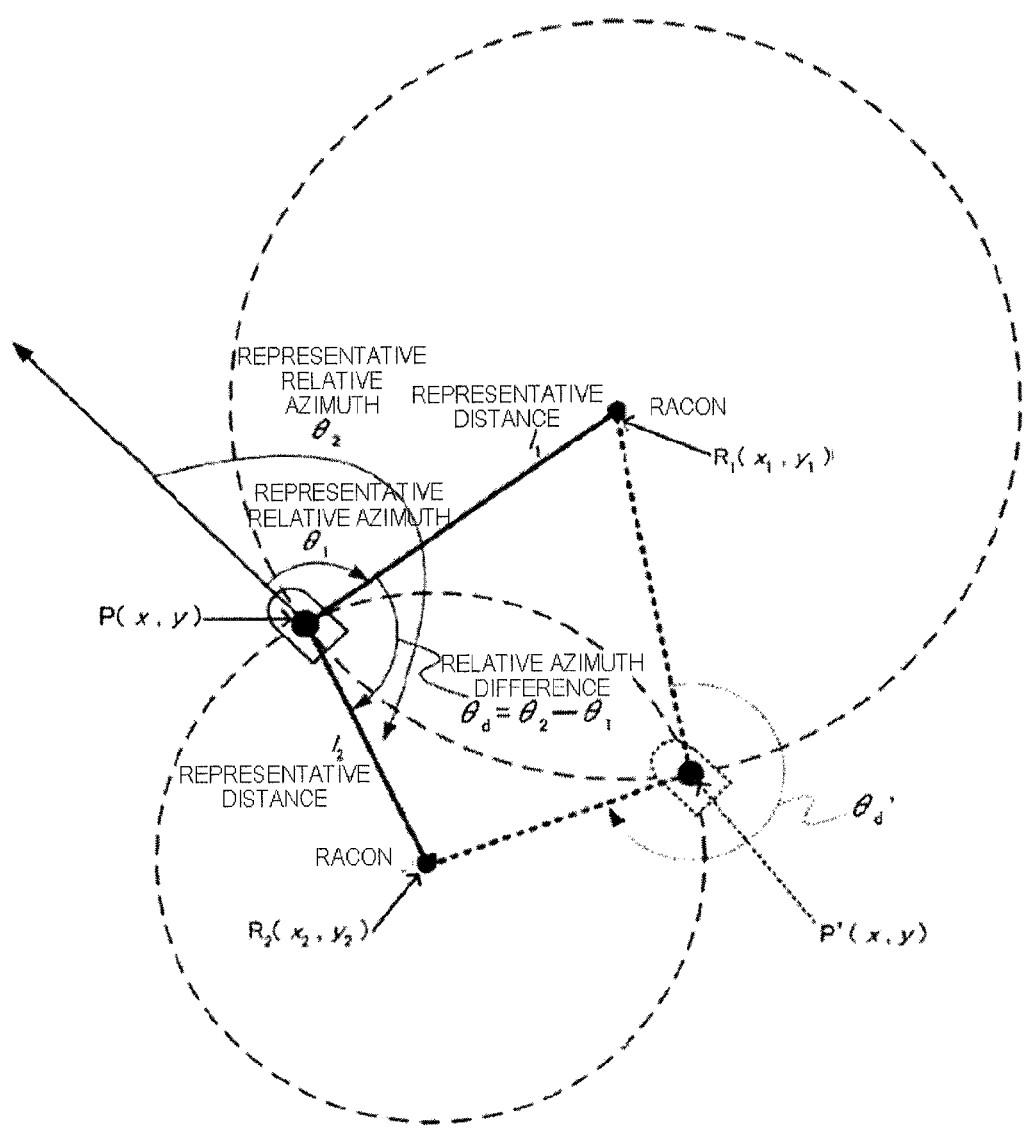
FIG. 10 is a view for illustrating processing by the positioning calculating module when the positional information of two racons exist.

Next, the processing when positional information of two racons (two positional information) exists is described. FIG. 10 is a view for illustrating the processing by the positioning calculating module 21 when the number of the racon positional information is two. Here, the radar transceiver 10 rotates the antenna unit 11 clockwise. Among the representative relative azimuths indicating angles taken by having the clockwise direction as positive with reference to the heading of the ship, the racon positional information with the angle of the smaller representative relative azimuth ($\theta_1$) is indicated as $R_1(x_1, y_1)$, and the racon positional information with the angle of the larger representative relative azimuth ($\theta_2$) is indicated as $R_2(x_2, y_2)$. Further, the representative distance corresponding to the racon positional information $R_1(x_1, y_1)$ is indicated as $1_1$, and the representative distance corresponding to racon positional information $R_2(x_2, y_2)$ is indicated as $1_2$.

The positioning calculating module 21 calculates the location $P(x, y)$ of the ship based on the following equation using the racon positional information $R_1(x_1, y_1)$, the representative distance $1_1$, the racon positional information $R_2(x_2, y_2)$, and the representative distance $1_2$.

$$\begin{cases} (x - x_1)^2 + (y - y_1)^2 = l_1^2 \\ (x - x_2)^2 + (y - y_2)^2 = l_2^2 \end{cases} \quad (2)$$

If the number of solutions of Equation 2 is one, the obtained solution is used as the ship location. When the number of solutions is two, either one of the two solutions is selected by using a difference ($\theta_2 - \theta_1$) of the representative relative azimuth therebetween, in which the representative relative azimuth corresponding to the racon positional information $R_1(x_1, y_1)$ is $\theta_1$ and the representative relative azimuth corresponding to the racon positional information $R_2(x_2, y_2)$ is $\theta_2$.

FIG. 10 shows a situation where two solutions of $P(x, y)$ and $P'(x, y)$ are obtained. Each of $P(x, y)$ and $P'(x, y)$ serves as a candidate location of the ship location. As a method of selecting the ship location from the two candidate locations, there is a method of calculating a relative azimuth difference when the ship location is $P(x, y)$ and a relative azimuth difference when the ship location is $P'(x, y)$, and comparing the calculation results with the representative relative azimuth difference ($\theta_2 - \theta_1$) to select the ship location.

Specifically, if the relative azimuth difference when the ship location is $P(x, y)$ substantially matches with the representative relative azimuth difference ($\theta_2 - \theta_1$) calculated by using the representative relative azimuth $\theta_1$ and the representative relative azimuth $\theta_2$, $P(x, y)$ is selected as the ship location. On the other hand, if the relative azimuth difference when the ship location is $P'(x, y)$ substantially matches with the representative relative azimuth difference ($\theta_2 - \theta_1$), $P'(x, y)$ is selected as the ship location. Note that, the match does not need to be precise because an error may exist in the calculation.

Further, by using a table showing positional relations among the racon positional information $R_1(x_1, y_1)$, the racon positional information $R_2(x_2, y_2)$, and the candidate locations $P(x, y)$ and $P'(x, y)$, the ship location can be selected without calculating the relative azimuth difference for when the ship location is $P(x, y)$ and calculating the relative azimuth difference for when the ship location are $P'(x, y)$.

Hereinafter, the positional relations among the racon positional information $R_1(x_1, y_1)$, the racon positional information $R_2(x_2, y_2)$, and the candidate locations $P(x, y)$ and $P'(x, y)$ are described. A line segment connecting between the two candidate locations $P(x, y)$ and $P'(x, y)$ (hereinafter, abbreviated as "PP'") and a line segment connecting between the two racon positional information $R_1(x_1, y_1)$ and $R_2(x_2, y_2)$ (hereinafter, abbreviated as "$R_1R_2$") are orthogonal to each other in any case and latitude lines and longitude lines thereof are also orthogonal to each other in any case.

Therefore, the positional relation in the east-west directions between the racon positional information $R_1(x_1, y_1)$ and $R_2(x_2, y_2)$ and the positional relation in the north-south directions between the candidate locations $P(x, y)$ and $P'(x, y)$ correspond to each other. By using this property, the ship location can be selected from the candidate locations $P(x, y)$ and $P'(x, y)$.

In orthogonal coordinates, four points $P(x, y)$, $P'(x, y)$, $R_1(x_1, y_1)$, and $R_2(x_2, y_2)$ exist, and when PP' and $R_1R_2$ interact at the origin and PP' $\perp$ $R_1R_2$ is satisfied, the four points $P(x, y)$, $P'(x, y)$, $R_1(x_1, y_1)$, and $R_2(x_2, y_2)$ are arranged at four quadrants, respectively.

FIGS. 11A to 11D are views for illustrating positional relations of the candidate locations of the ship with the racons.

Figure 11A:
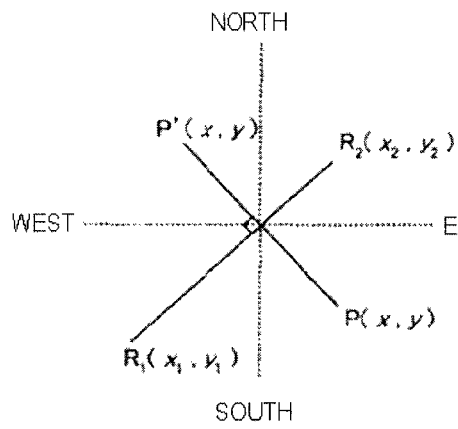
FIGS. 11A to 11D are views for illustrating positional relations of the candidate locations of the ship with the racons.

FIG. 11A shows when the racon positional information $R_1(x_1, y_1)$ is located at the third quadrant, and the racon positional information $R_2(x_2, y_2)$ is located at the first quadrant. In this case, the candidate location $P(x, y)$ is located at the fourth quadrant, and the candidate location $P'(x, y)$ is located at the second quadrant.

Figure 11C:
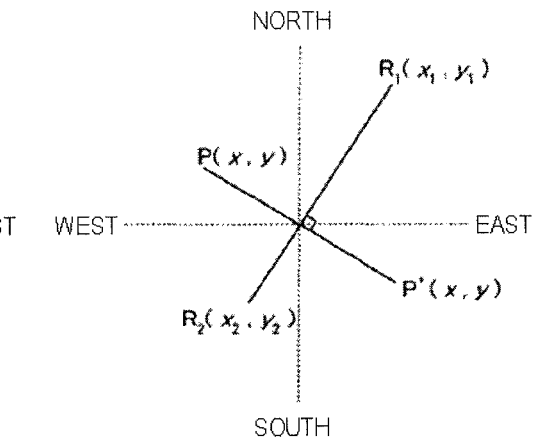
Figure 11B:
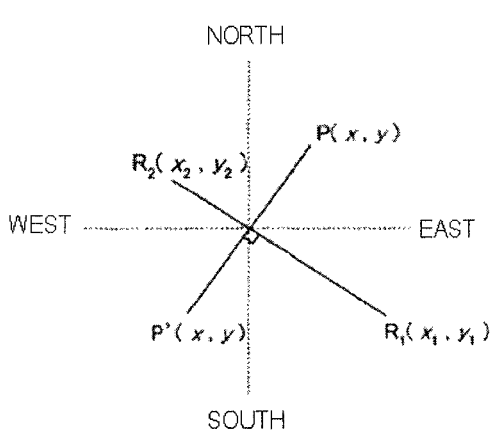

FIG. 11B shows when the racon positional information $R_1(x_1, y_1)$ is located at the fourth quadrant, and the racon positional information $R_2(x_2, y_2)$ is located at the second quadrant. In this case, the candidate location P(x, y) is located at the first quadrant, and the candidate location P'(x, y) is located at the third quadrant.

FIG. 11C shows when the racon positional information $R_1(x_1, y_1)$ is located at the first quadrant, and the racon positional information $R_2(x_2, y_2)$ is located at the third quadrant. In this case, the candidate location P(x, y) is located at the second quadrant, and the candidate location P'(x, y) is located at the fourth quadrant.

Figure 11D:
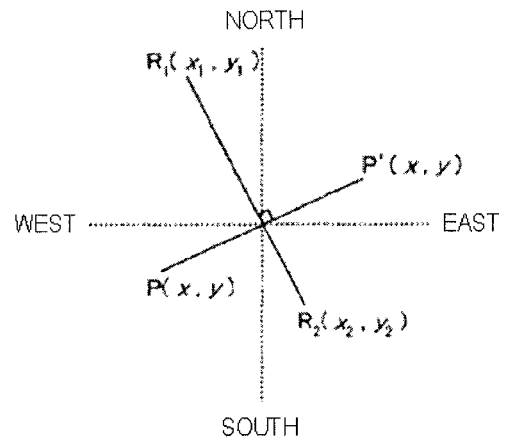

FIG. 11D shows when the racon positional information $R_1(x_1, y_1)$ is located at the second quadrant, and the racon positional information $R_2(x_2, y_2)$ is located at the fourth quadrant. In this case, the candidate location P(x, y) is located at the third quadrant, and the candidate location P'(x, y) is located at the first quadrant.

In FIG. 11, the candidate location P(x, y) corresponds to the ship location when the relative azimuth difference $(\theta_2-\theta_1)$ is below 180°, and the candidate location P'(x, y) corresponds to the ship location when the relative azimuth difference $(\theta_2-\theta_1)$ exceeds 180°. Therefore, based on the positional relation between the racon positional information $R_1(x_1, y_1)$ and the $R_2(x_2, y_2)$, the positional relation between the candidate points P(x, y) and P'(x, y) can be determined, and based on the relative azimuth difference $(\theta_2-\theta_1)$, either one of the candidate locations P(x, y) and P'(x, y) can be selected as the ship location.

FIGS. 12A and 12B are examples of the table used in selecting the ship location. FIG. 12A shows the table which is used when the relative azimuth difference exceeds 180°. Between the racon positional information $R_1(x_1, y_1)$ and the $R_2(x_2, y_2)$, if the racon corresponding to the racon positional information on the south is indicated as "S" and the racon corresponding to the racon positional information on the north is indicated as "N", when the racon positional information of the racon "S" is $R_1(x_1, y_1)$ and the racon "N" exists on the east of the racon "S" (in the case corresponding to FIG. 11A), the candidate location existing relatively on the north within the two candidate locations is selected as the ship location.

Further, when the racon positional information of the racon "S" is $R_1(x_1, y_1)$ and the racon "N" exists on the west of the racon "S" (in the case corresponding to FIG. 11B), the candidate location existing relatively on the south within the two candidate locations is selected as the ship location.

Further, when the racon positional information of the racon "S" is $R_2(x_2, y_2)$ and the racon "N" exists on the east of the racon "S" (in the case corresponding to FIG. 11C), the candidate location existing relatively on the south within the two candidate locations is selected as the ship location.

Furthermore, when the racon positional information of the racon "S" is $R_2(x_2, y_2)$ and the racon "N" exists on the west of the racon "S" (in the case corresponding to FIG. 11D), the candidate location existing relatively on the north within the two candidate locations is selected as the ship location.

FIG. 12B shows the table which is used when the relative azimuth difference is below 180°. Between the racon positional information $R_1(x_1, y_1)$ and the $R_2(x_2, y_2)$, if the racon corresponding to the racon positional information on the south is indicated as "S" and the racon corresponding to the racon positional information on the north is indicated as "N", when the racon positional information of the racon "S" is $R_1(x_1, y_1)$ and the racon "N" exists on the east of the racon "S" (in the case corresponding to FIG. 11A), the candidate location existing relatively on the south within the two candidate locations is selected as the ship location. When the racon positional information of a racon "S" is set to R1(x1, y1) and racon "N" exists east from racon "S", the candidate location of being south located between two candidate locations is chosen as a ship location (when it corresponds to FIG. 11A).

Further, when the racon positional information of the racon "S" is $R_1(x_1, y_1)$ and the racon "N" exists on the west of the racon "S" (in the case corresponding to FIG. 11B), the candidate location existing relatively on the north within the two candidate locations is selected as the ship location.

Further, when the racon positional information of the racon "S" is $R_2(x_2, y_2)$ and the racon "N" exists on the east of the racon "S" (in the case corresponding to FIG. 11C), the candidate location existing relatively on the north within the two candidate locations is selected as the ship location.

Furthermore, when the racon positional information of the racon "S" is $R_2(x_2, y_2)$ and the racon "N" exists on the west of the racon "S" (in the case corresponding to FIG. 11D), the candidate location existing relatively on the south within the two candidate locations is selected as the ship location.

Note that, although the table which is used in the case of determining the positional relation in the north-south directions between the candidate locations P(x, y) and P'(x, y) based on the positional relation in the east-west directions between the racon positional information $R_1(x_1, y_1)$ and $R_2(x_2, y_2)$ is illustrated in FIG. 12, the positional relation in the east-west directions between the candidate locations P(x, y) and P'(x, y) can also be determined based on the positional relation in the north-south directions between the racon positional information $R_1(x_1, y_1)$ and $R_2(x_2, y_2)$.

When determining the positional relation in the east-west directions between the candidate locations P(x, y) and P'(x, y) based on the positional relation in the north-south directions between the racon positional information $R_1(x_1, y_1)$ and $R_2(x_2, y_2)$, between the racon positional information $R_1(x_1, y_1)$ and the $R_2(x_2, y_2)$, the racon corresponding to the racon positional information on the west is indicated as "W" and the racon corresponding to the racon positional information on the east is indicated as "E", and thus, the selection between the candidate locations P(x, y) and P'(x, y) is performed based on whether the racon positional information of the racon "W" is $R_1(x_1, y_1)$ or $R_2(x_2, y_2)$, whether the racon "E" exists on the south of the racon "W", and whether the relative azimuth difference exceeds 180°.

Thus, the ship location can be selected from the two candidate locations using the relative azimuth difference. Moreover, the heading $\theta_H$ of the ship can be obtained by using the selected ship location and solving Equation 1 in which the heading $\theta_H$ of the ship is an unknown value.

Further, the method of selecting the ship location from the two candidate locations is not limited to the above described method of calculating the relative azimuth difference at each candidate location or using the tables, and arbitrary methods may be used. For example, a method may be used, in which either one of the two racon positional information is selected, an estimated location of the ship is calculated by the similar processing to when the racon positional information described above is one, and the candidate location closer to the estimated location within the two candidate locations is selected as the ship location.

Figure 13:
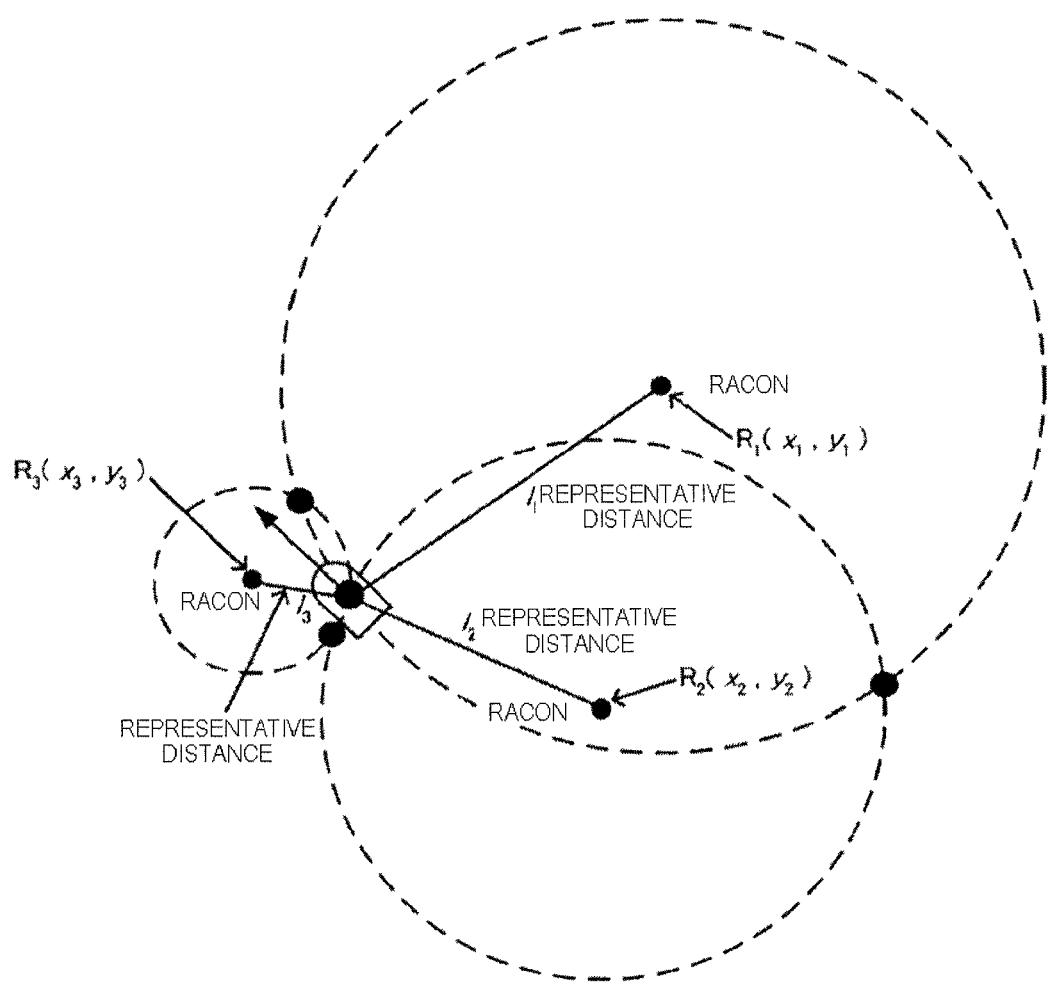
FIG. 13 is a view for illustrating processing by the positioning calculating module when the positional information of three or more racons exist.

Next, the processing when the positional information of three or more racons (three or more racon positional information) exists is described. FIG. 13 is a view for illustrating the processing by the positioning calculating module 21 when the three or more racon positional information exists. When three or more racon positional information is acquired, the positioning calculating module 21 selects two racon positional information from the three or more racon positional information, and performs the above described processing for when the number of the racon positional information is two to calculate the ship location.

When selecting two from the three or more racon positional information, it is desirable to select the two racon positional information with shorter representative distances because the occurrence of an error becomes less as the reception level is higher. Therefore, as shown in FIG. 13, when the three racon positional information $R_1$, $R_2$, and $R_3$ exist and the representative distances thereof have a relation of $l_3 < l_2 < l_1$, the ship location is calculated by using the racon positional information $R_2$ and $R_3$.

Moreover, when selecting two from the three or more racon positional information, it is desirable to select the two racon positional information between which angle with respect to the ship is closer to 90°. This is because, when the angle between two racons with respect to the ship is significantly smaller than 90° or significantly larger than 90°, there is a possibility that an error is caused.

Therefore, when selecting two from the three or more racon positional information, it is desirable to select a combination in which an evaluation index E described as follows has the smallest value. If the two racons to be selected are indicated as racons i and j, the representative distances thereof are indicated as Ri and Rj and the relative azimuth difference are indicated as θ(i, j), an evaluation index E(i, j) can be obtained from E(i, j)=a×|θ(i, j)−90|×Ri×Rj when θ(i, j)<180, and E(i, j)=a×|θ(i, j)−270|×Ri×Rj when θ(i, j)≥180.

Next, the processing by the positioning result smoothing module 22 shown in FIG. 4 is described further in detail. As being described above, the positioning calculating module 21 outputs the positional information after the positioning, to the positioning result smoothing module 22. The positioning result smoothing module 22 inputs the positioning result to a smoothing filter, and calculates the ship positional information. As the smoothing filter, a finite impulse response (FIR) filter, an infinite impulse response (IIR) filter, or a Kalman filter may be used.

For example, when using the FIR filter, if an n-th positioning result is indicated as a vector $q_n$, a vector $P_n$ showing the ship positional information is obtained based on the following equation.

$$P_n = \sum_{k=0}^{K} a_k q_{n-k} \qquad (3)$$

Here, $a_k$ is a coefficient for weighting, and the ship positional information corresponding to the n-th positioning result is K-times worth of positioning results from the past being weighted and smoothened.

Further, when using the IIR filter, if an n-th positioning result is indicated as the vector $q_n$, the vector $P_n$ showing the ship positional information is obtained based on the following equation.

$$P_n = \sum_{j=0}^{J} a_j q_{n-j} + \sum_{k=1}^{K} b_k P_{n-k} \qquad (4)$$

Here, $a_j$ and $b_k$ are coefficients for weighting, and the ship positional information corresponding to the n-th positioning result is J-times worth of positioning results from the past being weighted with the K-times worth of the ship information from the past and being smoothened.

Note that, the positioning result smoothing module 22 does not input all the positional information calculated by the positioning calculating module 21 to the smoothing filter but provides a restriction in inputting the positioning result to the smoothing filter. This is because it is necessary to exclude obviously false positional information.

Specifically, when the positioning result indicates a location away from the previous ship location by over a predetermined distance, the positioning result is removed and not adopted to be inputted to the smoothing filter. Moreover, when the positioning result shows a change in the traveling direction of the ship from the previous ship traveling direction by over a predetermined angle, the positioning result is removed and not adopted to be inputted to the smoothing filter.

Figure 14:
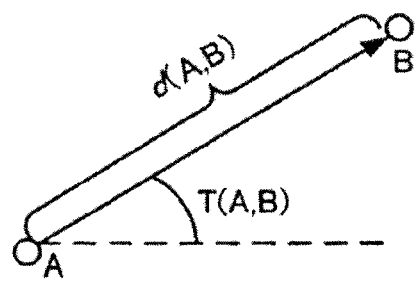
FIG. 14 is a view for illustrating a restriction of an input to a smoothing filter by a positioning result smoothing module.

FIG. 14 is a view for illustrating the input restriction to the smoothing filter by the positioning result smoothing module 22. The location A in FIG. 14 is the ship location calculated using the previous (i.e., (n-1th)) positioning result. Further, the location B in FIG. 14 is the ship location calculated using the n-th positioning result. The distance between the locations A and B is d(A, B), and the angle between a straight line extending from the location A to the location B and the heading of the ship with respect to the location A is T(A, B).

The positioning result smoothing module 22 sets an upper-limit Th_d for d(A, B) and an upper-limit Th_θ for T(A, B), and determines whether to input the positioning result to the smoothing filter. Note that, the upper-limit Th_d and the upper-limit Th_θ are determined based on the assumed traveling and turning speeds regarding to the travel of the ship, and the change of the ship location.

Figure 15:
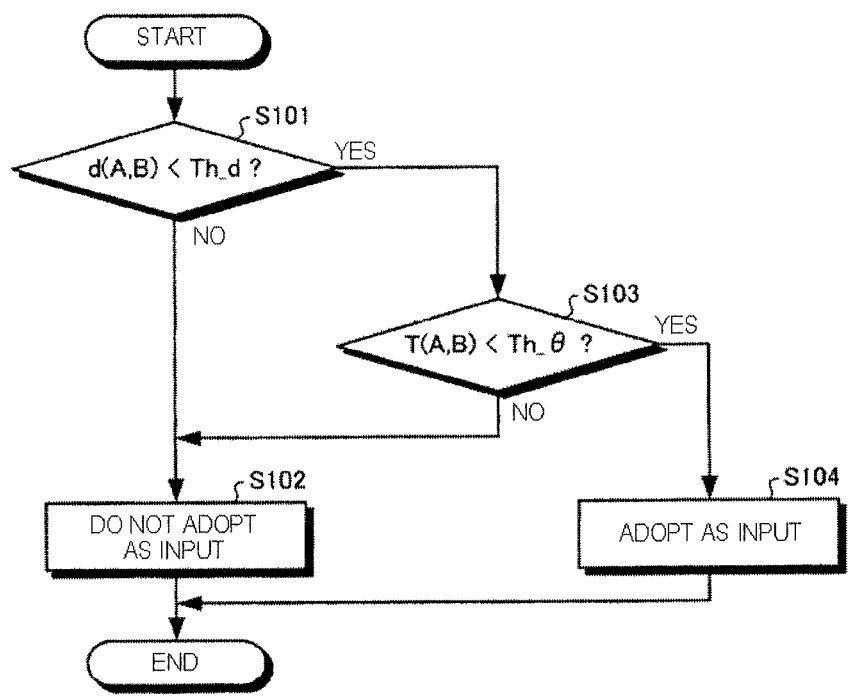
FIG. 15 is a flowchart showing a processing procedure of the input restriction of the smoothing filter by the positioning result smoothing module.

FIG. 15 is a flowchart showing a processing procedure of the input restriction of the smoothing filter by the positioning result smoothing module 22. As shown in FIG. 15, the positioning result smoothing module 22 determines whether d(A, B) is below the upper-limit Th_d (Step S101). As a result, if d(A, B) is above the upper-limit Th_d (Step S101: NO), the positioning result smoothing module 22 does not adopt the location B as the input to the smoothing filter (Step S102), and ends the processing.

On the other hand, if d(A, B) is below the upper-limit Th_d (Step S101: YES), the positioning result smoothing module 22 determines whether T(A, B) is below the upper-limit Th_θ (Step S103). As a result, if T(A, B) is above the upper-limit Th_θ (Step S103: NO), the positioning result smoothing module 22 does not adopt the location B as the input to the smoothing filter (Step S102), and ends the processing.

On the other hand, if T(A, B) is under upper-limit Th_θ (Step S103: YES), the positioning result smoothing module 22 adopts the location B as the input to the smoothing filter (Step S104) and ends the processing.

Figure 16:
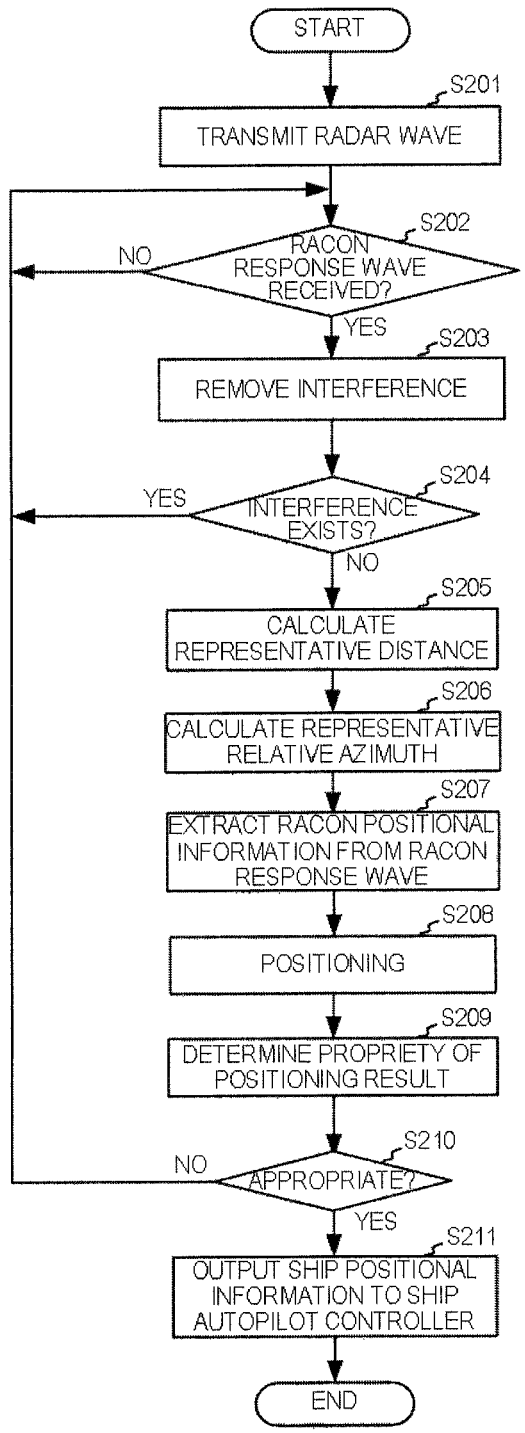
FIG. 16 is a flowchart showing a processing procedure of a radar transceiver shown in FIG. 4.

Next, the procedure in a case of realizing the processing by the radar transceiver 10 shown in FIG. 4 by software is described. FIG. 16 is a flowchart showing the processing procedure of the radar transceiver 10 shown in FIG. 4. Here, for the convenience in the description, the description of the processing relating to the radar reflection wave caused by the reflection of the radar wave is omitted.

Moreover, all the processing by the radar wave transmission processing module 14, the radar signal processing module 16, the interference removing module 18, the representative distance/representative relative azimuth calculating module 19, the demodulating module 20, the positioning calculating module 21, and the positioning result smoothing module 22 shown in FIG. 4 are performed in programs on a CPU. Therefore, the programs corresponding to the radar wave transmission processing module 14, the radar signal processing module 16, the interference removing module 18, the representative distance/representative relative azimuth calculating module 19, the demodulating module 20, the positioning calculating module 21, and the positioning result smoothing module 22 are stored in the radar transceiver 10 on a flash memory of a ROM. These programs are read and executed by the CPU.

As shown in FIG. 16, the radar transceiver 10 generates radar waves including radar pulses and transmit them from the antenna unit 11 (Step S201). After receiving the radar waves, the racon 40 generates racon response waves including racon discrimination information and racon positional information, and transmits it to the radar transceiver 10.

Then, the radar transceiver 10 determines whether the racon response waves are received (Step S202), and if the racon response waves are not received (Step S202: NO), it shifts to Step S202. On the other hand, if the radar transceiver 10 receives the racon response waves (Step S202: YES), the interference removing module 18 performs interference removing processing on the racon response waves (Step S203). Specifically, when the racon response waves are not continuous over the predetermined azimuth angle range, the racon response waves are determined to be interference. Then, if the racon response waves are determined to be interference (Step S204: YES), these racon response waves are excluded from the processing target, and the processing shifts to Step S202.

On the other hand, if the racon response waves are determined to be not caused by interference (Step S204: NO), the representative distance/representative relative azimuth calculating module 19 calculates a representative distance based on the received racon response waves (Step S205). Specifically, the representative distance/representative relative azimuth calculating module 19 subtracts from the reaching time point of the racon discrimination information, a time length required for receiving the racon discrimination information contained in each of the racon response waves and a time length corresponding to the racon response delay to calculate the reaching time point of the racon response wave, and based on the time difference from the transmission time point of the radar wave to the reaching time point of the racon response wave, a representative distance is calculated.

Then, the representative distance/representative relative azimuth calculating module 19 calculates a representative relative azimuth from the received racon response waves (Step S206). Specifically, among the racon response waves continuous over the predetermined azimuth angle range, the azimuth corresponding to the time point of receiving the racon response wave with the highest reception level is defined as the representative relative azimuth.

Then, the demodulating module 20 performs demodulation on the received racon response waves, and extracts racon positional information from the signal series acquired by the demodulation (Step S207). Note that, this demodulation can even be performed at the radar wave reception time point or before calculating the representative distance.

Then, the positioning calculating module 21 calculates the ship location by using the representative distance, the representative relative azimuth, and the racon positional information (Step S208). The positioning calculating module 21 outputs the calculated ship location to the positioning result smoothing module 22 as the positioning result.

Then, the positioning result smoothing module 22 determines the propriety of the positional information which is the positioning result (Step S209). Specifically, when the positional information is away from the previous ship positional information by over a predetermined distance, the positional information is determined to be inappropriate, and when the positional information shows over a predetermined angle of change of the traveling direction, the positioning result is determined to be inappropriate.

If the positional information serving as the positioning result is inappropriate (Step S210: NO), the positional information is not inputted to the smoothing filter, and the processing shifts to Step S202. On the other hand, if the positioning result is appropriate (Step S210: YES), the positioning result smoothing module 22 inputs the positional information serving as the positioning result to the smoothing filter to calculate the ship positional information, and outputs the ship positional information to the ship autopilot controller (Step S211), and ends the processing.

Next, the modification of the ship radar positioning system is described. In the above description, the case where the racon 40 transmits the racon response waves containing the racon positional information and the radar transceiver 10 extracts the racon positional information from the racon response waves is described; however, not limiting to this, the present invention may be configured so that the racon 40 may transmit racon response waves, each containing a racon discrimination ID (racon discrimination information and racon ID) of the racon so that the radar transceiver 10 can identify the racon positional information associated with the racon discrimination ID extracted from each racon response wave.

Figure 17:
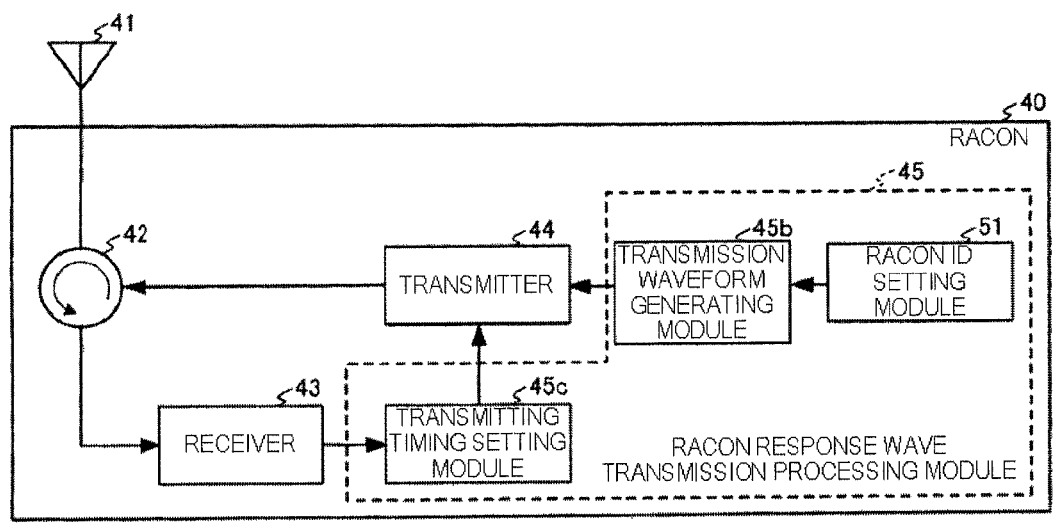
FIG. 17 is a block diagram showing a configuration of the racon when the racon transmits a racon response wave including a discrimination ID of the racon.

FIG. 17 is a block diagram showing a configuration of the racon 40 when it transmits the racon response waves containing the racon discrimination ID of the racon 40. The racon 40 shown in FIG. 17 has a racon ID setting module 51 instead of the positional information setting module 45a.

The racon ID setting module 51 outputs to the transmission waveform generating module 45b the racon ID for uniquely identifying the racon 40, in addition to the racon discrimination information that shows it is from a racon. Therefore, in this case, the transmission waveform generating module 45b adds the signal series corresponding to the racon ID on the racon discrimination information to generate the transmission waveform of each racon response wave. Since other parts of the configuration and processing contents are the same as that of the racon 40 shown in FIG. 2, the same numerals are applied to the same components, and the detailed description thereof is omitted.

Figure 18:
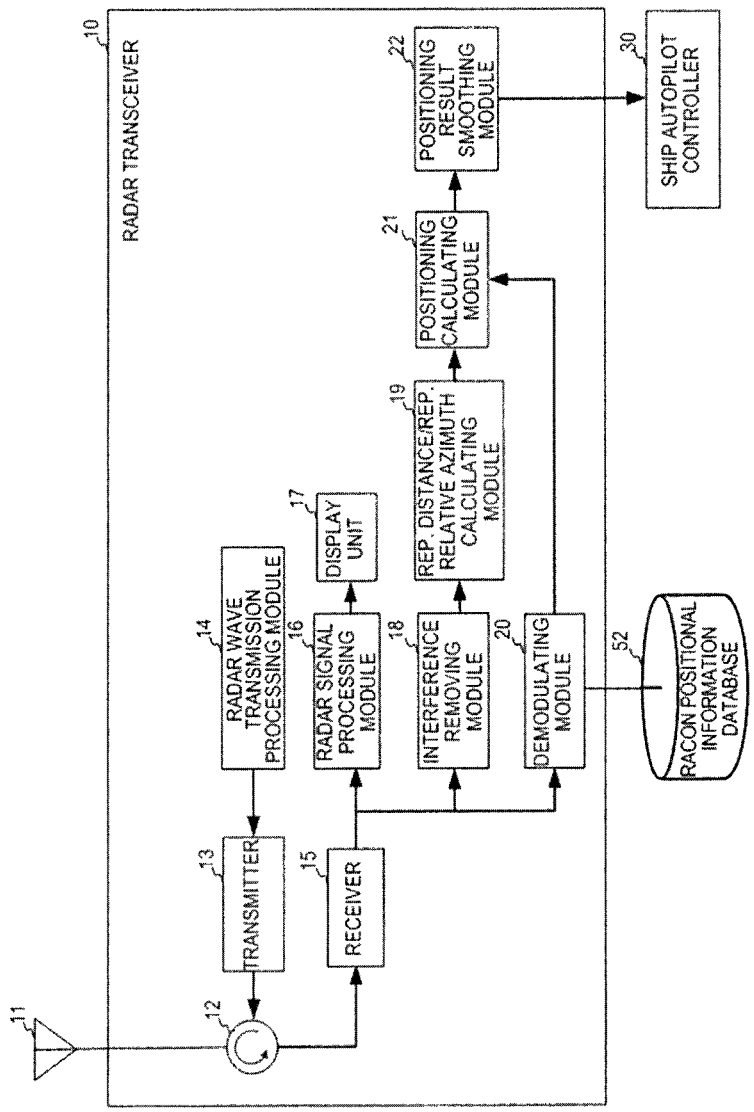
FIG. 18 is a block diagram showing a configuration of the radar transceiver for identifying positional information of the racon based on a racon ID contained in the racon response wave.

FIG. 18 is a block diagram showing a configuration of the radar transceiver 10 for identifying the positional information of the racon 40 from the racon ID contained in a racon response wave. The radar transceiver 10 shown in FIG. 18 includes a demodulating module 53 instead of the demodulating module 20. It also includes a racon positional information database 52.

The demodulating module 53 demodulates the racon response waves contained in the antenna reception waves outputted from the receiver 15 by using a demodulation scheme corresponding to the modulation scheme of the racon response wave. The racon discrimination information and the racon ID which are contained in each of the racon response waves are extracted by the demodulation. The demodulating module 53 acquires the racon positional information associated with the extracted racon ID from the racon positional information database 52, and outputs the acquired racon positional information to the positioning calculating module 21. Since other parts of the configuration and processing contents are the same as that of the radar transceiver 10 shown in FIG. 4, the same numerals are applied to the same components, and the detailed description thereof is omitted.

FIG. 19 is a table showing an example of the racon positional information database 52. As shown in FIG. 19, the racon positional information database 52 stores the racon ID and the racon positional information in association to each other. Specifically, the racon positional information [latitude 34 ° 50' 00", longitude 134° 70' 00"] is associated and stored with the racon ID "00001." The racon positional information [latitude 34° 51' 00", longitude 134° 71' 00"] is associated and stored with the racon ID "00002." Therefore, only if the racon ID of the racon 40 is identified, the positional information of the racon 40 can be acquired.

Next, the modification of the processing which is performed by the positioning calculating module 21 when three or more racon positional information is acquired is described. When three or more racon positional information is acquired, a positioning may be performed using all the acquired racon positional information. Specifically, when the number of acquired racon positional information is M, M equations can be obtained according to the following formula.

$$(x-x_i)^2+(y-y_i)^2=l_i^2$$

$$i \in \{x|x \text{ Integar number}, 3 \leq x \leq M\} \quad (5)$$

Note that, the number of the equations is larger than the number of variables and a single solution cannot be obtained generally, and thus, the following equation corresponding to each of the M equations added with an error ($\epsilon i$) is used.

$$(x-x_i)^2+(y-y_i)^2=l_i^2+\epsilon_i$$

$$i \in \{x|x \text{Integar number}, 3 \leq x \leq M\} \quad (6)$$

Further, an approximate solution is calculated using a method (e.g., least square method) of determining the approximate solution to have a minimum error ($\epsilon i$), and the approximate solution is defined as the positioning result. Thereby, the positioning accuracy can be improved in the case that three or more racon positional information can be acquired.

As described above, in this embodiment, the racon 40 transmits the racon response wave containing the racon positional information after receiving the radar wave from the radar transceiver 10 installed on the ship. The radar transceiver 10 calculates the representative distance and the representative relative azimuth of the racon 40 from the radar transceiver 10 based on the racon response waves continuous over the predetermined azimuth angle range, and the radar transceiver 10 calculates the location of itself based on the calculated representative distance and representative relative azimuth, and the racon positional information contained in each of the racon response waves. Therefore, the location of the ship can be calculated efficiently by using the racon response waves.

Note that, in this embodiment, the case is described where the ship positional information calculated by the radar transceiver 10 is outputted to the ship autopilot controller 30 and is used for control of an autopilot; however, not limiting to this, the present invention may also be used when displaying the ship location on a nautical chart in a predetermined display device such as the display unit 17.

Further, in this embodiment, the case is described where the racon discrimination information and the information for identifying the location of the racon (racon positional information or racon ID) are contained in each racon response wave; however, the racon response wave may additionally contain other information. For example, an error detection and an error correction can be performed by including an error detecting code and an error correcting code.

Furthermore, in this embodiment, the case where GNSS is not installed is described; however, not limiting to this, the present invention is also applicable to a case where a ship installed with GNSS combines to use the radar positioning method according to this embodiment and GNSS. This is because, by using the radar positioning method according to the present invention, even if electromagnetic waves which are emitted by the solar flare and disturbance waves exist, without receiving these effects, the ship can smoothly travel automatically. In areas, especially in a narrow water channel, where the racon 40 is provided, the radar positioning method according to this embodiment is desired to be prioritized than GNSS.

Further, in this embodiment, the case where the present invention is applied to the ship radar positioning system is described; however, not limiting to this, the present invention is also applicable to other radar systems, such as a radar system for airplanes.

As described above, the radar device, the radar positioning system, the radar positioning method, and the radar positioning program according to the present invention are suitable in efficiently calculating a location of a movable body by using response waves transmitted from a transponder device in response to radar waves.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A radar device installed in a movable body and for transmitting electromagnetic waves at a predetermined frequency and receiving response waves transmitted from a transponder in response to the electromagnetic waves, respectively, the radar device comprising:

a representative distance calculator configured to calculate a representative distance from the radar device to the transponder based on the response waves that are continuous over a predetermined azimuth angle range;

a representative relative azimuth calculator configured to calculate a representative relative azimuth of the transponder from the radar device based on the continuous response waves;

a positioning component configured to calculate a location of the radar device based on positional information of the transponder that is contained in each of the response waves, the calculated representative distance, and the calculated representative relative azimuth; and a removing component configured to remove, when only below a predetermined number of the continuous response waves over the predetermined azimuth angle range are received, the received response waves transmitted from the transponder.

2. The radar device of claim 1, wherein the received response waves are removed when a difference more than a predetermined threshold exists in reception timing between the response waves even if the predetermined or greater number of the continuous response waves over the predetermined azimuth angle range are received.

3. The radar device of claim 2, wherein the predetermined threshold is determined based on ranging accuracy of the radar device and accuracy of a response delay time length of the transponder.

4. The radar device of claim 2, wherein the removing component is further configured to remove the received response waves when the predetermined or greater number of continuous response waves includes a predetermined number of continuous reception waves having differences more than the predetermined threshold between their reception timings.

5. A radar device installed in a movable body and for transmitting electromagnetic waves at a predetermined frequency and receiving response waves transmitted from a transponder in response to the electromagnetic waves, respectively, the radar device comprising:
- a representative distance calculator configured to calculate a representative distance from the radar device to the transponder based on the response waves that are continuous over a predetermined azimuth angle range;
- a representative relative azimuth calculator configured to calculate a representative relative azimuth of the transponder from the radar device based on the continuous response waves; and
- a positioning component configured to calculate a location of the radar device based on positional information of the transponder that is contained in each of the response waves, the calculated representative distance, and the calculated representative relative azimuth, the positioning component comprising:
  - a candidate location calculator configured to calculate a plurality of candidate locations by calculating each of the candidate locations based on positional information, representative distances, and representative relative azimuths of a plurality of transponders; and
  - a selector configured to select the location of the radar device from the plurality of calculated candidate locations, such that among two, first and second candidate locations of the plurality of candidate locations calculated by the candidate location calculator, the selector selects the first candidate location as the location of the radar device when a first relative azimuth difference corresponding to a difference in relative azimuth between first and second transponders with respect to a heading of the movable body at the first candidate location is substantially equal to a second relative azimuth difference corresponding to a difference in representative relative azimuth between the first and second transponders calculated by the representative relative azimuth calculator.

6. A radar device installed in a movable body and for transmitting electromagnetic waves at a predetermined frequency and receiving response waves transmitted from a transponder in response to the electromagnetic waves, respectively, the radar device comprising:
- a representative distance calculator configured to calculate a representative distance from the radar device to the transponder based on the response waves that are continuous over a predetermined azimuth angle range;
- a representative relative azimuth calculator configured to calculate a representative relative azimuth of the transponder from the radar device based on the continuous response waves; and
- a positioning component configured to calculate a location of the radar device based on positional information of the transponder that is contained in each of the response waves, the calculated representative distance, and the calculated representative relative azimuth, the positioning component comprising:
  - a candidate location calculator configured to calculate a plurality of candidate locations by calculating each of the candidate locations based on positional information, representative distances, and representative relative azimuths of a plurality of transponders; and
  - a selector configured to select the location of the radar device from the plurality of calculated candidate locations, such that among two, first and second candidate locations of the plurality of candidate locations calculated by the candidate location calculator, the selector selects the location of the radar device based on a positional relation in east-west or north-south directions between the first and second transponders by using characteristics of first and second transponders and the first and second candidate locations locating in quadrants, respectively, centering on an intersection point between a straight line connecting the first candidate location with the second candidate location and a straight line connecting the first transponder with the second transponder.

* * * * *